United States Patent
Mukherjee et al.

(10) Patent No.: US 11,563,586 B2
(45) Date of Patent: Jan. 24, 2023

(54) MORE EFFICIENT POST-QUANTUM SIGNATURES

(71) Applicant: Visa International Service Association, San Francisco, CA (US)

(72) Inventors: Pratyay Mukherjee, Sunnyvale, CA (US); Yilei Chen, Palo Alto, CA (US); Nicholas Genise, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 0 days.

(21) Appl. No.: 17/429,317

(22) PCT Filed: Aug. 1, 2019

(86) PCT No.: PCT/US2019/044753
§ 371 (c)(1),
(2) Date: Aug. 6, 2021

(87) PCT Pub. No.: WO2020/162973
PCT Pub. Date: Aug. 13, 2020

(65) Prior Publication Data
US 2022/0045865 A1  Feb. 10, 2022

Related U.S. Application Data

(60) Provisional application No. 62/803,325, filed on Feb. 8, 2019.

(51) Int. Cl.
*H04L 9/32* (2006.01)
*H04L 9/30* (2006.01)
(52) U.S. Cl.
CPC .......... *H04L 9/3247* (2013.01); *H04L 9/3093* (2013.01)

(58) Field of Classification Search
None
See application file for complete search history.

(56) References Cited

U.S. PATENT DOCUMENTS

2015/0326392 A1* 11/2015 Cheng ................. H04L 9/14
380/28
2017/0366349 A1  12/2017 Lyubashevsky et al.
2017/0366358 A1  12/2017 Lyubashevsky et al.

FOREIGN PATENT DOCUMENTS

CN    104052607    *  6/2014
CN    104038347       9/2014
(Continued)

OTHER PUBLICATIONS

Micciancio, Daniele et al. "Trapdoors for Lattices: Simpler, Tighter, Faster, Smaller" [online] IACR, Sep. 14, 2011 [retrieved Apr. 21, 2022]. Retrieved from the Internet: URL: https://eprint.iacr.org/2011/501.pdf (Year: 2011).*

(Continued)

*Primary Examiner* — Taghi T Arani
*Assistant Examiner* — Joshua Raymond White
(74) *Attorney, Agent, or Firm* — Kilpatrick Townsend & Stockton LLP

(57) ABSTRACT

Techniques of generating a lattice-based verification matrix and signature vector are disclosed. The method enables a generating device to sample a gadget matrix and then generate a reduced gadget matrix. The generating device may then sample a trapdoor matrix and use the trapdoor matrix and the reduced gadget matrix to generate a verification matrix. A sending device may receive the trapdoor matrix and the verification matrix from the generating device, in addition to receiving a message. The sending device may then use the trapdoor matrix and the verification matrix to generate a signature vector for the message. A verification device can receive the verification matrix, the (Continued)

message, and the signature vector. The verification device may use the verification matrix and the signature vector to verify the message.

16 Claims, 10 Drawing Sheets

(56) References Cited

FOREIGN PATENT DOCUMENTS

| JP | 2013524277 | 6/2013 |
|---|---|---|
| KR | 101837338 | 3/2018 |
| KR | 101864932 | 6/2018 |

OTHER PUBLICATIONS

Bai, Shi et al. "Improved Combinatorial Algorithms for the Inhomogeneous Short Integer Solution Problem" [online] Springer, Oct. 15, 2018 [retrieved Apr. 21, 2022]. Retrieved from the Internet: URL: https://link.springer.com/content/pdf/10.1007/s00145-018-9304-1.pdf (Year: 2018).*

Vaikuntanathan, Vinod et al. "Sampling Lattice Trapdoors" [online] MIT, Nov. 10, 2015 [retrieved Apr. 21, 2022]. Retrieved from the Internet: URL: https://people.csail.mit.edu/vinodv/6876-Fall2015/L16.pdf (Year: 2015).*

Application No. CA3,129,118, Office Action, dated Dec. 15, 2021, 3 pages.

Application No. CN201980091523.2, Office Action, dated Dec. 28, 2021, 11 pages.

Genise et al., "Faster Gaussian Sampling for Trapdoor Lattices with Arbitrary Modulus", Eurocrypt, LNCS, vol. 10820, Feb. 8, 2018, 24 pages.

Micciancio et al., "Trapdoors for Lattices:Simpler, Tighter, Faster, Smaller", Eurocrypt, LNCS, vol. 7237, Mailed on 2012, 18 pages.

Peikert, "A Decade of Lattice Cryptography", Department of Computer Science of Engineering, University of Michigan/School of Computer Science, Georgia Institute of Technology, Feb. 27, 2016, 90 pages.

Application No. PCT/US2019/044753, International Search Report and Written Opinion, dated Nov. 14, 2019, 10 pages.

Bai et al., "An Improved Compression Technique for Signatures Base on Learning with Errors (slides)", Available online at :https://docs.huihoo.com/rsaconference/usa-2014/cryp-t07-non-integral-asymmetric-functions-copy1.pdf, Jan. 1, 2014, 48 pages.

Ducas et al., "CRYSTALS—Dilithium Algorithm Specifications and Supporting Documentation", Available online at: https://pq-crystals.org/dilithium/data/dilithium-specification.pdf, Nov. 30, 2017, 30 pages.

Application No. EP19914310.8, Extended European Search Report, dated Mar. 4, 2022, 9 pages.

Application No. JP2021-546215, Office Action, dated May 10, 2022, 5 pages.

Sato et al., "Reconsideration of Signcryption Configuration Method Based on Lattice Problem", Computer Security Symposium Proceedings, Information Processing Society of Japan, vol. 2016, No. 2, Oct. 4, 2016, pp. 68-75_Abstract.

Application No. SG11202108410P, Written Opinion, dated May 25, 2022, 8 pages.

Application No. CN201980091523.2, Office Action, dated Jun. 27, 2022, 6 pages.

Application No. CA3,129,118, Office Action, dated Jul. 19, 2022, 6 pages.

* cited by examiner

| Params | Exact | Approx | Approx | Exact | Approx | Approx | Exact | Approx | Approx |
|---|---|---|---|---|---|---|---|---|---|
| $n$ | 512 | 512 | 512 | 512 | 512 | 512 | 512 | 512 | 512 |
| $\lceil \log_2 q \rceil$ | 24 | 24 | 24 | 16 | 16 | 16 | 16 | 16 | 16 |
| $b$ | 2 | 2 | 2 | 2 | 2 | 2 | 4 | 4 | 4 |
| $l$ | 0 | 12 | 15 | 0 | 7 | 9 | 0 | 2 | 4 |
| $\tau$ | 40 | 40 | 40 | 2.6 | 2.6 | 2.6 | 2.6 | 2.6 | 2.6 |
| $s$ | 38317.0 | 29615.3 | 26726.3 | 2170.7 | 1756.3 | 1616.2 | 3114.2 | 2833.3 | 2505.6 |
| $m$ | 13312 | 7168 | 5632 | 9216 | 5632 | 4608 | 5120 | 4096 | 3072 |
| $\|x\|_2$ | 4441737.7 | 2521387.0 | 2035008.5 | 211100.9 | 133305.5 | 109339.1 | 223740.1 | 183004.9 | 138145.7 |
| $\|z\|_2$ | 0 | 374014.0 | 21189876 | 0 | 11897.9 | 46428.4 | 0 | 1402.3 | 19807.1 |
| PK | 37.50 | 19.50 | 15.00 | 17.00 | 10.00 | 8.00 | 9.00 | 7.00 | 5.00 |
| Sig | 25.68 | 13.53 | 10.51 | 13.16 | 7.83 | 6.30 | 7.62 | 5.94 | 4.45 |
| LWE | 100.0 | 100.0 | 100.0 | 104.7 | 104.7 | 104.7 | 104.7 | 104.7 | 104.7 |
| AISIS | 92.3 | 97.6 | 93.1 | 95.6 | 100.6 | 99.8 | 94.8 | 97.3 | 99.5 |

Summary of the concrete parameters. The size of PK and Sig are measured in kB. $\|x\|_2$, $\|z\|_2$ are the upper-bounds of the norms of the preimage and the error term. LWE and AISIS refer to the estimations of security levels for the pseudorandomness of the PK and finding a short approximate preimage.

FIG. 6

Algorithm 1: $\text{GSAMP.CUT}(v, \sigma)$

Input: $v \in \mathbb{Z}_q, \sigma \in \mathbb{R}^+$
Output: $z \in \mathbb{Z}^{k-1}$ 701  Sample $x \in \mathbb{Z}^k$ from $D_{\Lambda_v^\perp(g^t), \sigma}$.
702  Let $z$ be the last $k-l$ entries of $x$.
703  return $z$.

---

Algorithm 2: $\text{APPROX.TRAPGEN}(\lambda)_\chi$

Input: Security parameter $\lambda$
Output: matrix-approximate trapdoor pair $(A, R)$.

711  Sample a uniformly random $\bar{A} \leftarrow U(\mathbb{Z}_q^{n \times n})$.
712  Let $\hat{A} := [I_n, \bar{A}]$.
713  Sample the approximate trapdoor $R \leftarrow \chi^{2n \times w}$.
714  Form $A := [\hat{A} | F - \bar{A}R] \in \mathbb{Z}_q^{n \times m}$.
     return $(A, R)$.

---

Algorithm 3: $\text{APPROX.SAMPLEPRE}(A, R, u, s)$.

Input: $(A, R, u, s)$ as in Theorem 4.1.
Output: An approximate preimage of $u$ for $A$, $y \in \mathbb{Z}^m$.

721  Sample a perturbation $p \leftarrow D_{\mathbb{Z}^m, \sqrt{\Sigma_p}}$.
722  Form $v = u - Ap \in \mathbb{Z}_q^n$.
723  Sample the approximate gadget preimage $z \in \mathbb{Z}^{n(k-l)}$ as $z \leftarrow \text{GSAMP.CUT}(v, \sigma)$.
724  Form $y := p + \begin{bmatrix} R \\ I \end{bmatrix} z \in \mathbb{Z}^m$.
725  return $y$.

FIG. 7

| Params | Exact | Approx | Approx | Exact | Approx | Approx | Exact | Approx | Approx |
|---|---|---|---|---|---|---|---|---|---|
| $n$ | 512 | 512 | 512 | 512 | 512 | 512 | 512 | 512 | 512 |
| $\lceil \log_2 q \rceil$ | 24 | 24 | 24 | 20 | 20 | 20 | 16 | 16 | 16 |
| $b$ | 2 | 2 | 2 | 2 | 2 | 2 | 2 | 2 | 2 |
| $l$ | 0 | 12 | 15 | 0 | 10 | 12 | 0 | 7 | 9 |
| $\tau$ | 40 | 40 | 40 | 10 | 10 | 10 | 2.6 | 2.6 | 2.6 |
| $s$ | 38317.0 | 29615.3 | 26726.3 | 8946.4 | 6919.8 | 6416.4 | 2170.7 | 1756.3 | 1618.2 |
| $m$ | 13312 | 7168 | 5632 | 11264 | 6144 | 5120 | 9216 | 5632 | 4608 |
| $\|x\|_2$ | 4441737.7 | 2521387.0 | 2035008.5 | 956758.1 | 545470.5 | 464022.0 | 211100.9 | 133305.5 | 109339.1 |
| $\|x\|_\infty$ | 184653 | 111909 | 94550 | 38507 | 25275 | 24762 | 8848 | 6853 | 6334 |
| $\|z\|_2$ | 0 | 374014.0 | 2118987.6 | 0 | 94916.6 | 3436682.9 | 0 | 11897.9 | 46428.4 |
| $\|z\|_\infty$ | 0 | 46895 | 346439 | 0 | 13265 | 52789 | 0 | 1439 | 7213 |
| PK | 37.50 | 19.50 | 15.00 | 26.25 | 13.75 | 11.25 | 17.00 | 10.00 | 8.00 |
| Sig | 25.68 | 13.53 | 10.51 | 18.87 | 10.01 | 8.29 | 13.16 | 7.83 | 6.30 |
| LWE | 100.0 | 100.0 | 100.0 | 102.8 | 102.8 | 102.8 | 104.7 | 104.7 | 104.7 |
| AISIS | 92.3 | 97.6 | 93.1 | 93.4 | 99.2 | 96.2 | 95.6 | 100.6 | 99.8 |
| $\delta$ | 1.00685 | 1.00643 | 1.00678 | 1.00670 | 1.00631 | 1.00653 | 1.00658 | 1.00621 | 1.00623 |
| $k$ | 174 | 193 | 177 | 180 | 199 | 188 | 186 | 204 | 201 |

Summary of the concrete parameters, with base $b = 2$, aiming at around 100-bit security. The sizes of PK and Sig are measured in kB. $\tau$ is the Gaussian width of the secret matrix $\mathbf{R}$. $s$ is the Gaussian width of the preimage. "LWE" refers to the security level of the pseudorandomness of the PK. "AISIS" refers to the security level of breaking approximate ISIS. $\delta$ and $k$ are the variables used in the AISIS security estimation.

FIG. 8

| Params | Exact | Approx | Approx | Exact | Approx | Approx | Exact | Approx | Approx |
|---|---|---|---|---|---|---|---|---|---|
| $n$ | 512 | 512 | 512 | 1024 | 1024 | 1024 | 1024 | 1024 | 1024 |
| $\lceil \log_2 q \rceil$ | 16 | 16 | 16 | 18 | 18 | 18 | 18 | 18 | 18 |
| $b$ | 4 | 4 | 4 | 8 | 8 | 8 | 4 | 4 | 4 |
| $l$ | 0 | 2 | 4 | 0 | 2 | 3 | 0 | 4 | 5 |
| $\tau$ | 2.6 | 2.6 | 2.6 | 2.8 | 2.8 | 2.8 | 2.8 | 2.8 | 2.8 |
| $s$ | 3114.2 | 2833.3 | 2505.6 | 8861.1 | 7324.8 | 7227.9 | 5118.8 | 4297.8 | 4015.5 |
| $m$ | 5120 | 4096 | 3072 | 8192 | 6144 | 5120 | 11264 | 7168 | 6144 |
| $\|x\|_2$ | 223740.1 | 183004.9 | 138145.7 | 805772.9 | 604711.5 | 516446.3 | 552713.4 | 369981.2 | 311153.9 |
| $\|x\|_\infty$ | 13320 | 11868 | 8948 | 35348 | 28823 | 30435 | 19274 | 18283 | 14927 |
| $\|z\|_2$ | 0 | 1402.3 | 19807.1 | 0 | 7316.5 | 54379.8 | 0 | 29958.0 | 115616.4 |
| $\|z\|_\infty$ | 0 | 174 | 2448 | 0 | 905 | 6680 | 0 | 3025 | 12070 |
| PK | 9.00 | 7.00 | 5.00 | 15.75 | 11.25 | 9.00 | 22.50 | 13.50 | 11.25 |
| Sig | 7.62 | 5.94 | 4.45 | 13.70 | 10.14 | 8.36 | 18.74 | 11.09 | 9.38 |
| LWE | 104.7 | 104.7 | 104.7 | 192.7 | 192.7 | 192.7 | 192.7 | 192.7 | 192.7 |
| AISIS | 94.8 | 97.3 | 99.5 | 177.6 | 185.0 | 187.0 | 187.9 | 197.6 | 195.6 |
| $\delta$ | 1.00664 | 1.00645 | 1.00629 | 1.00336 | 1.00347 | 1.00343 | 1.00342 | 1.00326 | 1.00329 |
| $k$ | 183 | 192 | 200 | 462 | 488 | 495 | 498 | 532 | 525 |

Summary of the concrete parameters, with base $b \geq 4$, aiming at around 100-bit and 192-bit security.

FIG. 9

MORE EFFICIENT POST-QUANTUM SIGNATURES

CROSS REFERENCE(S) TO RELATED APPLICATIONS

This application is a 371 application of international application number PCT/US2019/044753, filed on Aug. 1, 2019 of and claims the benefit of the filing date of U.S. Provisional Application No. 62/803,325, filed on Feb. 8, 2019, which is herein incorporated by reference in its entirety.

BACKGROUND

Many crytosystems today, e.g. RSA encryption, are based on problems such as prime factorization or modular exponentiation. These problems are hard for conventional computers, but may not be for quantum computers. Thus new advances in quantum computing may render cryptosystems based on those problems unsecure. There is a need for new cryptosystems based on problems that are hard for both conventional computers and quantum computers.

Lattice-based problems can be used as the basis for cryptosystems. One example of a lattice problem may be the short integer solution problem, which relates to finding the shortest vector in an n-dimensional lattice of points. Lattice problems can be shown to be hard for both conventional and quantum computers. However, computing the cryptographic keys for lattice-based cryptosystems can be computationally expensive, and can result in large keys that also make it difficult to sign and verify messages. Therefore, there is a need to make lattice-based cryptography more efficient.

Embodiments of the present disclosure address these and other problems, individually and collectively.

BRIEF SUMMARY

Some embodiments of the present disclosure are directed to methods of generating a lattice-based cryptographic verification key and an associated trapdoor matrix. A generating device can generate a gadget matrix G. The generating device can then drop the first l columns of the gadget matrix G to generate a reduced gadget matrix F. Then, the generating device can sample a distribution to form a trapdoor matrix R. The trapdoor matrix R can function as a secret key for generating a digital signature, and may be an approximate trapdoor. The generating device can then use the reduced gadget matrix F and the trapdoor matrix R to generate a verification matrix A. The generating device can transmit the verification matrix A to one or more verification devices. The one or more verification devices can use the verification matrix A to verify a digital signature x generated by a sending device to sign a message m, if the digital signature x was generated using the trapdoor matrix R.

Other embodiments of the present disclosure are directed to methods of generating a lattice-based signature. A sending device can receive a message m. The message may be a hash h(m), or the sending device may hash the message m to generate the hash h(m). The sending device may also store a verification matrix A and a trapdoor matrix R. The sending device may generate a signature vector x using the verification matrix A and the trapdoor matrix R. The signature vector x may be generated such that, for some modulus q and an error vector e, the relationship $Ax = h(m) + e \mod q$ is satisfied. The modulus q can be selected to give a desired level of data security (e.g., selecting $q = 2^{24}$ may give 100-bit security). The signing device may transmit the message m and the signature vector x to a verification device. The verification device may have previously received the verification matrix A, or may receive the verification matrix A from the sending device, and may use the verification matrix A to verify that the signature vector x was generated by the sending device. This may allow the verification device to verify that the message m is from the sending device as well.

Other embodiments of the present disclosure are directed to methods of verifying a lattice-based signature. A verification device can store a verification matrix A. The verification device can also receive a message m and a signature vector x from a sending device. The message may be a hash h(m), or the verification device may hash the message m to generate the hash h(m). The verification device may compute an error vector e and by solving $Ax = h(m) + e \mod q$ for some modulus q and quantify the size of the error vector e. The verification device can compare the error vector e to a threshold and verify the signature vector x if the error vector e is less than the threshold. For example, if the length of the error vector e is less than the dimension of the hash h(m).

Other embodiments of the present disclosure are directed to systems and computer readable media associated with the above-described methods.

These and other embodiments of the invention are described in further detail below with reference to the Figures and the Detailed Description.

BRIEF DESCRIPTION OF THE DRAWINGS

FIG. 6 shows a summary table of concrete parameters according to some embodiments.

FIG. 7 shows algorithms for verification matrix generation and signature vector generation according to some embodiments.

FIG. 8 shows another table of concrete parameters according to some embodiments.

FIG. 9 shows another table of concrete parameters according to some embodiments.

DETAILED DESCRIPTION

Figure 1:
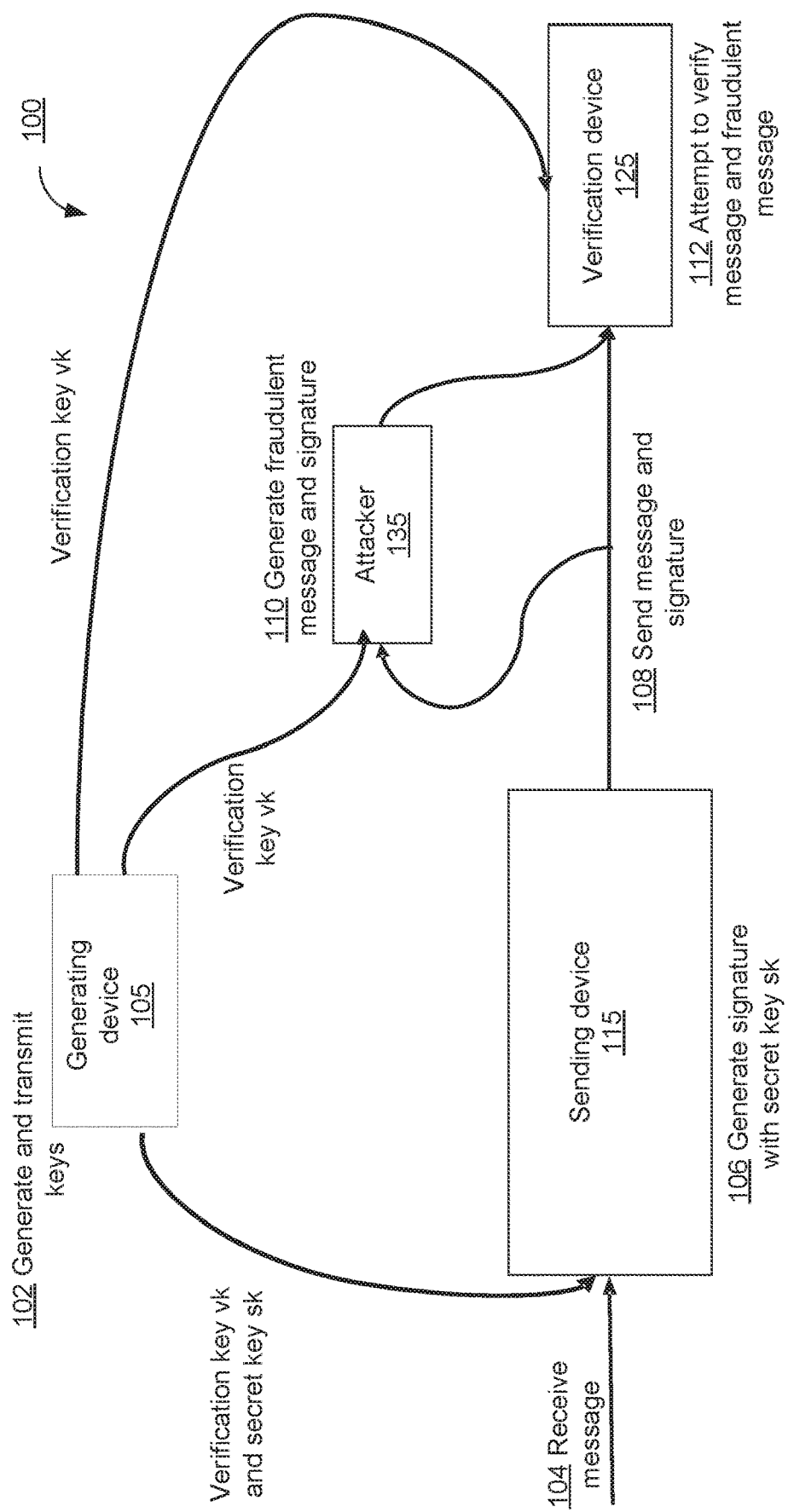
FIG. 1 shows a block diagram of a system according to some embodiments.

Lattice-based cryptography, cryptography based on lattice problems, can provide cryptographic solutions that are robust especially with the development of quantum computing that can reduce the effectiveness of more traditional cryptosystems. Lattice problems include, for example, the inhomogeneous short integer solution (ISIS) problem, which relates to finding the shortest vector in an n-dimensional lattice of points. The inhomogeneous short integer solution (ISIS) problem asks to find a vector x that satisfies the relationship $A \cdot x = y \pmod{q}$. In this example, the vector y may be a message, or a hash of the message, and the vector x may be a signature associated with the message. Lattice problems can be computationally difficult, even with quantum computing, making them well suited for cryptographic applications. Solving lattice problems can be made easier with a trapdoor matrix, which can be a matrix that makes a hard problem (such as the ISIS problem) easy, or computable within a reasonable time. In the example of the ISIS problem, a trapdoor matrix can be used to compute the vector x without needing to solve the equation. Thus in a cryptographic application, a trapdoor can function as a secret key.

Different constructions of a trapdoor matrix can have different impacts on the size and usefulness of the lattice problem as a cryptosystem. Trapdoor matrices that solve exactly solve the ISIS problem may result in the public key (the verification matrix A) and the private key (the trapdoor matrix) being very large, and thus not very practical for signing messages and transmitting signatures.

Instead, embodiments can use an approximate trapdoor which relaxes the solution to the ISIS problems to find an approximate solution instead of an exact solution, i.e., $A \cdot x = y + e \pmod{q}$, with an error vector e. The signature can still be verified if the error vector is small. In particular, a gadget matrix (a matrix where columns comprise ascending powers of a small base) can be used to find an exact trapdoor matrix, and by removing a few columns of the gadget matrix, a reduced gadget matrix can be used to find an approximate trapdoor matrix. With the approximate solution, the signature x, the trapdoor matrix and the verification matrix A can be smaller and thus more practical.

In embodiments, a generating device can compute a verification matrix A and a trapdoor matrix R. The verification matrix A, functioning as a public key, can be distributed or even made public. In particular, the verification matrix A can be sent to a sending device, that will send signed messages, and a verification device, that will verify the signature on the messages to authenticate the sending device. The trapdoor matrix R, functioning as a private key, can be sent securely to the sending device, enabling the sending device to generate a signature.

I. INTRODUCTION

In the past two decades, lattice-based cryptography has emerged as an active area of research. It can enable both advanced cryptographic capabilities, such as fully homomorphic encryption [Gen09]; and practical post-quantum secure public-key encryptions and signatures, as observed in the ongoing NIST post-quantum cryptography (PQC) standardization procedure [AAAS+19]. A large fraction of the lattice-based cryptosystems uses lattice trapdoors. Those cryptosystems include basic primitives like public-key encryption and signature schemes [GGH97, HPS98, HHP+03, GPV08], as well as advanced primitives such as identity-based encryption [GPV08, ABB10, CHKP12], attribute-based encryption [GVW13], and graded encodings [GGH15].

In this work, we focus on the trapdoor for the lattice-based one-way function defined by Ajtai [Ajt96], and its application in digital signatures [GPV08]. Given a wide, random matrix A, and a target vector y. The inhomogeneous short integer solution (ISIS) problem asks to find a short vector x as a preimage of y, i.e. $A \cdot x = y \pmod{q}$:

Without the trapdoor, finding a short preimage is proven to be as hard as solving certain lattice problems in the worst case [Ajt96]. A trapdoor for the matrix A, on the other hand, allows its owner to efficiently produce a short preimage. An explicit construction of the trapdoor for Ajtai's function was first given in [Ajt99] and later simplified by [AP11, MP12].

Towards the proper use of lattice trapdoors in cryptography, what really gives the trapdoor a punch is the work of Gentry, Peikert and Vaikuntanathan [GPV08]. They show how to sample a short preimage from a trapdoor-independent distribution, instead of a distribution which may leak information about the trapdoor (as observed by the attacks [GS02, NR06] on the initial attempts of building lattice-based signatures [GGH97, HHP+03]). The trapdoor-independent preimage sampling algorithm allows [GPV08] to securely build a hash-and-sign signature as follows: Let the matrix A be the public verification key, the trapdoor of A be the secret signing key. To sign a message m, first hash it to a vector y, then use the trapdoor to sample a short preimage x as the signature. The secret signing key is guaranteed to be hidden from the signatures, since the signatures are produced from a trapdoor-independent distribution.

Despite its elegant design, the hash-and-sign signature based on Ajtai's function suffers from practical inefficiency due to its large key size and signature size. Indeed, all the three lattice-based signature candidates that enter the second round of NIST PQC standardization [AAAS+19] are built from two alternative approaches—Falcon [FHK+18] is based on the hash-and-sign paradigm over NTRU lattices; Dilithium [DKL+18] and qTESLA [ABB+19] are based on the rejection sampling approach [Lyu12, BG14]. The suggested parameters for the three candidates lead to competitive performance measures. For example, for 128-bit security, the sizes of the public keys & signatures for all the three candidates are below 5 kB & 4 kB (respectively). By contrast, for the hash-and-sign signature based on Ajtai's function, the sizes of the public keys & signatures are more than 35 kB & 25 kB according to the implementation benchmarks of [BB13, BFRS18, GPR+18].

We can define a relaxed notion of lattice trapdoors called approximate trapdoors, which can be used to solve the ISIS problem approximately instead of exactly. The primary motivation is to improve the efficiency of hash-and-sign signatures based on Ajtai's one-way function. With a relaxation of the correctness requirement, it is possible to generate smaller public matrices, trapdoors, and preimages for Ajtai's function, which translate to smaller public-keys, secret-keys, and signatures for the hash-and-sign signature scheme.

Embodiments of the disclosure show that the gadget trapdoor proposed by Micciancio and Peikert [MP12] can be modified to an approximate trapdoor. In particular, we show how to use the approximate gadget trapdoor to sample preimages from a trapdoor-independent distribution. The analysis of the distribution can use linear transformations of discrete Gaussians on lattices.

Our approximate gadget trapdoor can be used together with existing optimization techniques, such as using the Hermite normal form and using a bigger base in the gadget, to improve the concrete performance of the hash-and-sign signature in the random oracle model under RingLWE and RingSIS assumptions. We show that the sizes of the public key & signature can be reduced to 5 kB & 4.45 kB for an estimation of 100-bit security, and 11.25 kB & 9.38 kB for an estimation of 192-bit security. Those are much closer to the sizes of the signatures based on the rejection sampling approach [Lyu12, BG14, DKL+18, ABB+19].

A. Example Cryptographic Context

FIG. 1 shows a sequence diagram of a system 100 according to embodiments. System 100 may comprise a generating device 105, a sending device 115, and a verification device 125. The system 100 may also comprise an attacker 135. System 100 may be a system that uses signature generation and verification according to embodiments of the disclosure. For example, in one embodiment, sending device 115 may be a device of a user sending a message to transfer funds from one account to another account. Verification device 125 may be an issuer verifying the message to prevent a fraudulent transfer. In another embodiment, sending device 115 may be a device sending a message to request access to a secure database. Verification device 125 may be an access gateway that controls access to the secure database and may verify the message prior to granting access. In some embodiments, generating device 105 and sending device 115 may be the same device. In other embodiments, generating device 105 and verification device 125 may be the same device.

In step 102, the generating device 105 can generate a verification key vk and a secret key sk. For example, the verification key vk may be a verification matrix A and the secret key sk may be a trapdoor matrix R. The generating device 105 can then publicly transmit the verification key vk to the verification device 125. An attacker 135 may also receive the verification key vk. The generating device 105 can also privately send the secret key sk to the sending device 115.

In step 104, the sending device 115 can receive a message m. The sending device 115 can then hash the message with a hashing function to generate a hashed message h(m). Alternatively, the sending device 115 may generate the message m or may receive the hash h(m).

In step 106, the sending device 115 can generate a signature sig based on the hash h(m) and the secret key sk. For example, the sending device 115 can generate the signature sig compute a function of the hash h(m) and the secret key sk. The sending device 115 may generate the signature sig such that the product of the verification key vk and the signature sig is the hashed message h(m).

In step 108, the sending device 115 can send the message m and the signature sig to a verification device 125. The attacker 135 may be able to intercept the message m and the signature sig as they are sent.

In step 110, the attacker 135 may attempt to modify the message m to generate a fraudulent message m'. The attacker 135 may also attempt to modify the signature sig to generate a fraudulent signature sig'. However, because the attacker 135 does not have access to the secret key sk, they may not be able to generate a valid signature. Therefore, the fraudulent signature sig' may not be a valid signature. The attacker 135 may then send the fraudulent message m' and the fraudulent signature sig' to the verification device 125.

In step 112, the verification device 125 can attempt to verify the message m from the sending device 115 and the fraudulent message m' from the attacker 135. For example, the verification device 125 may multiply the signature sig and the verification key vk, and compare the result to the hashed message h(m). If the result is equal to the hash h(m), or within an accepted threshold, then the message m can be verified. If the result is not equal to the hashed message h(m), or within an accepted threshold, then the message m may not be verified. More generally, verifying may involve a function of the message, the hashed message, the signature, and/or the verification key. Signatures that were not generated with the secret key sk may not give valid result and may not be verified. The verification device 125 can thus differentiate between authentic messages sent by the sending device 115 and fraudulent messages sent by the attacker 135.

B. Generation of Verification Matrix

A verification matrix can be generated that is used as a public key to verify a signature. A trapdoor matrix (as a private key) can also be generated, which can be used in generating the verification matrix and in generating the signature.

Figure 2:
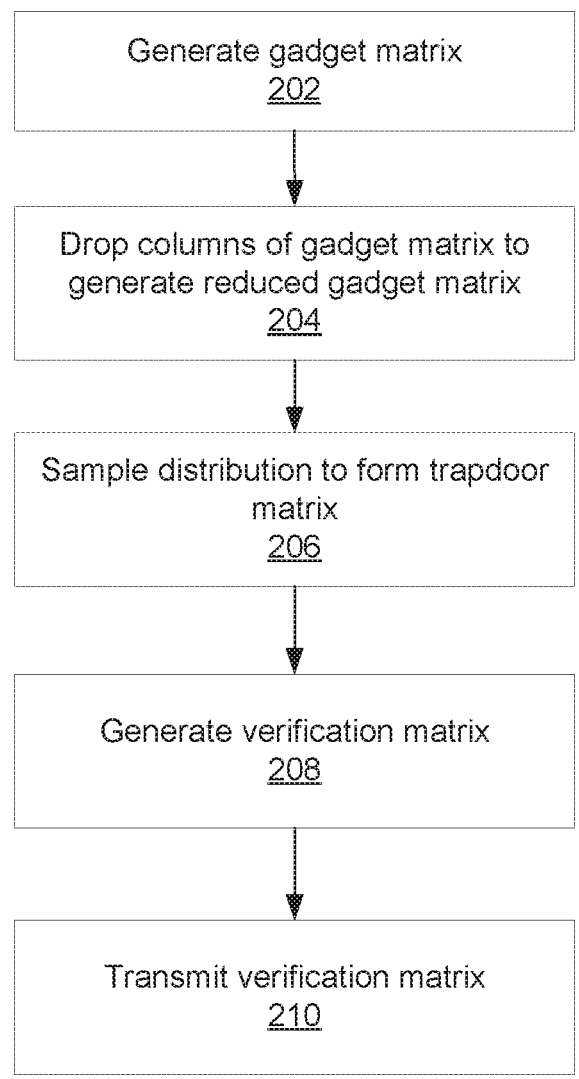
FIG. 2 shows a general flow diagram for lattice-based verification matrix and trapdoor generation according to some embodiments.

FIG. 2 shows a flow diagram of a key generation process according to embodiments of the disclosure. In some embodiments, key generation may be done by a generating device (e.g., 105 in FIG. 1), which may also be a sending device. The key may be a lattice-based cryptographic verification key.

In step 202, the generating device may generate a gadget matrix G. The gadget matrix G may be a matrix where all entries are powers of a small integer b, e.g., 2, 3, 4, or 5. For example, the entries of the gadget matrix G may be ascending powers of 2. The gadget matrix G may have dimensions n×log q. n may be a security parameter, such as 64, 128, 256, and 512. q may be set to $n\sqrt{n}$. In some embodiments, the modulus q may be between $2^{16}$ to $2^{24}$.

In step 204, the generating device may reduce the dimensions of the gadget matrix G by dropping selected columns to generate a reduced gadget matrix F. For example, the generating device may drop the first l columns of the gadget matrix G. The parameter l may be chosen, for example, to be between 0 and $$\frac{\log_b q}{2},$$

or between 0 and log q. l may be experimentally determined to provide a desired security level and key size. A larger value of l (resulting a smaller reduced gadget matrix F) may result in smaller keys, but may also be less secure. A larger value of l (resulting in a larger reduced gadget matrix F) may result in greater security but with larger keys. For example, for a security parameter n=512 and base b=2, the modulus may be set to q=$2^{24}$. Then l may be chosen from the range between 0 and 12.

In step 206, the generating device may sample a distribution to form a trapdoor matrix R. For example, each element of the trapdoor matrix R may be sampled independently from a Gaussian distribution with a small standard deviation. The trapdoor matrix R can also be used to calculate a small matrix D, where $$D = \begin{bmatrix} R \\ I \end{bmatrix}.$$

D may thus be the trapdoor matrix R vertically augmented with an identity matrix of the same dimensions. A small matrix may be a matrix where each entry is less than n. The trapdoor matrix R can function as a secret key for generating a digital signature.

In step 208, the generating device may generate a verification matrix A. The generating device may first generate a matrix $\overline{A}$, based on a uniformly random matrix $\hat{A}$. Each element in the uniformly random matrix $\hat{A}$ may be chosen with equal probability. A can then be calculated from F, R, and $\overline{A}$ as A:=[$\overline{A}$|F−$\overline{A}$R]. Thus, the verification matrix A is the matrix $\overline{A}$ augmented with the matrix resulting from the expression F−$\overline{A}$R.

In step 210, the generating device may transmit the verification matrix A to a sending device (e.g., 115 in FIG. 1). The verification matrix A may serve as a publicly known verification key. If the generating device is not the sending device, then the generating device may also transmit the trapdoor matrix R and/or the small matrix D to the sending device. The trapdoor matrix R may be sent, for example, by a secure channel or using a secret sharing algorithm. A secure channel may include, for example, an Internet communication channel secured with SSH encryption or manually writing the trapdoor matrix R and sending to the sending device.

C. Signature Generation

Figure 3:
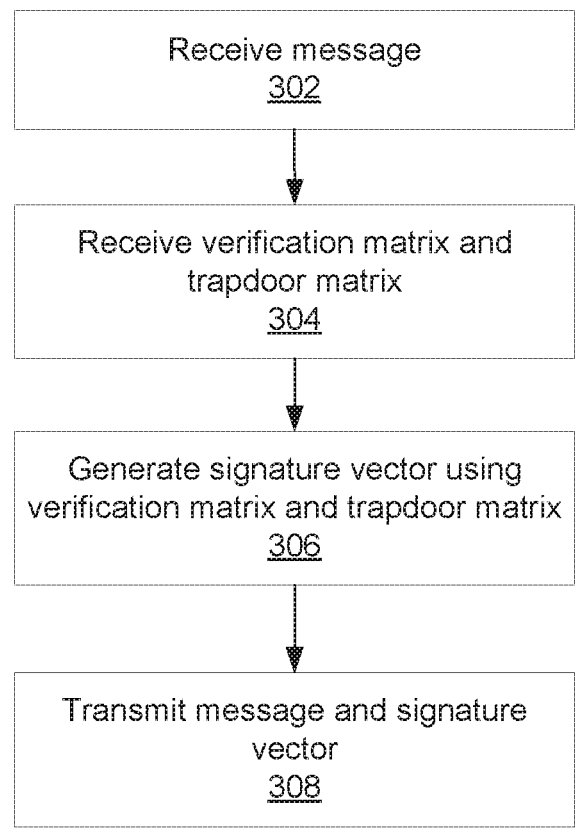
FIG. 3 shows a general flow diagram for lattice-based signature generation according to some embodiments.

FIG. 3 shows a flow diagram of signature generation process according to embodiments of the disclosure. The signature may be a lattice-based signature vector. In some embodiments, signature generation may be done by a sending device (e.g., sending device 115 of FIG. 1).

In step 302, the sending device can receive a message m. In some embodiments, the sending device may have generated the message m. The message m may be, for example, an authorization request message or a payment transaction message. The message m may be hashed. The sending device can hash the message m to generate a hashed message h(m). For example, the sending device may take the modulus of the message m. The message m and the hash h(m) may be vectors.

In step 304, the sending device can store a verification matrix A and a trapdoor matrix R. The verification matrix A and the trapdoor matrix R may be received from a generating device. In some embodiments, the sending device may generate the verification matrix A and the trapdoor matrix R. The sending device may receive a small matrix D instead of, or in addition to, the trapdoor matrix R. The trapdoor matrix R and the verification matrix A may be received, for example, through a secure channel or using a secret sharing algorithm. A secure channel may include, for example, an Internet communication channel secured with SSH encryption.

In step 306, the sending device may generate a signature vector x using the hash h(m), the verification matrix A and the trapdoor matrix R. The sending device may first sample a probability distribution (e.g., a Gaussian distribution) to form a perturbation vector p. Each element in the perturbation vector p can be independently sampled from the probability distribution. The sending device may then compute a lattice vector v=h(m)−Ap. The lattice vector v may then be used to sample an intermediate vector z from an lattice Gaussian distribution based on a lattice formed form the lattice vector v. A lattice Gaussian distribution may be a discrete Gaussian distribution over a lattice, in particular the lattice defined by lattice vector v. Then, the sending device can then generate the signature vector x from a product of the intermediate vector z and the trapdoor matrix R as $$x = p + \begin{bmatrix} R \\ I \end{bmatrix} z.$$

The perturbation p may prevent an attacker from determining the trapdoor matrix R based on a message-signature pair. As the perturbation p can be sampled from a distribution that does not depend on the message m or the trapdoor matrix R, it can mask the trapdoor matrix R in the signature vector x.

In step 308, the sending device may transmit the message m and the signature vector x. These can be transmitted to a verification device. The sending device may also transmit the verification matrix A to the verification device. The verification device can then verify the message m. The verification device can multiply the verification matrix A by the signature vector x, and if the result matches the hashed message with a small error then the message m can be verified. The verification device can also verify that the signature vector x was generated by the sending device.

D. Signature Verification

Figure 4:
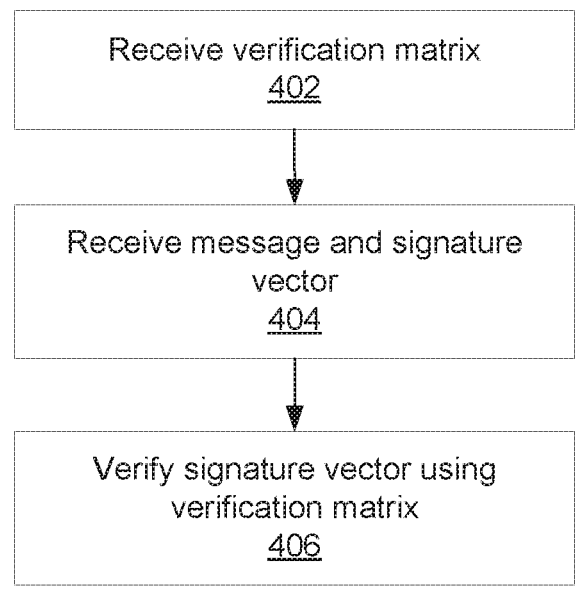
FIG. 4 shows a general flow diagram for verification of lattice-based signatures according to some embodiments.

FIG. 4 shows a flow diagram of verifying a signature vector x with a verification matrix A. In some embodiments, verification may be done by a verification device (e.g., verification device 125 in FIG. 1).

In step 402, the verification device can store a verification matrix A. The verification matrix A may be received from a generating device. Alternatively, the verification device may receive the verification matrix A from a sending device, or may be publically available. The verification matrix A may alternatively be generated by the verification device.

In step 404, the verification device can receive a message m and a signature vector x from a sending device. The verification device may receive a hashed message h(m) in addition to, or instead of the message m. The verification device may hash the message m to generate the hashed message h(m). The message m and the hash h(m) may be vectors.

In step 406, the verification device can use the verification matrix A to verify the signature vector x. In order to verify the signature vector x, the verification device can compute and error vector e by solving the equation Ax=h(m)+e mod q, for some modulus q. In particular, because Ax−h(m)=e mod q, the verification device can compute Ax−h(m) with the verification matrix A, the signature vector x, and the hash h(m) to determine the error vector e. The modulus q may be determined as $n\sqrt{n}$ for a security parameter n. For example, for a parameter n=128, q may be $2^{23}$. In some embodiments, the modulus q may be selected from a range between $2^{16}$ and $2^{24}$. Because the signature vector x and verification matrix A are generated with an approximate trapdoor, the product may not be exactly the hash h(m), but instead may differ by the error vector e. If the signature vector x had been generated with an exact trapdoor, the error vector e would be 0. The verification device can then quantify the size of the error vector e, such as by finding the Euclidean length of the error vector e, and compare the size to a threshold. In other embodiments, the size of the error vector e can be quantified using a different $l_p$-norm, or an infinity norm.

If the error vector e is less than the threshold then the signature vector x can be verified. In some embodiments, the threshold may be the dimension of the hash h(m) (e.g., the dimension of a vector of the hash h(m)). In other embodiments, the threshold may be chosen between 0 and $$\frac{q}{4}.$$

For example, if q=$2^{23}$, the threshold may be $2^{12}$. If the error vector e is large, this can indicate that the message m was not signed with signature vector x generated from the same trapdoor as the verification matrix A, and thus the message m is likely fraudulent or otherwise compromised.

After the signature is verified, the verification device can act upon information in the message. As one example, the message may include a request to access a secure area, such as a building or venue, or to access secure data or other resource that may reside on a networked computer. After verifying the signature and the message, the verification device can then send an indication to an access device to allow access. As another example, the message may include a request to establish a secure connection between the sending device and the verification device. After verifying the message, the verification device can establish the secure connection, e.g., by performing a key exchange. Additionally, or alternatively, the verification device may respond to the sending device. The response may include information such as a cryptogram, an encryption key, or secure data, such as an access token. Some embodiments may be applied to a payment processing system. For example, the message may be a payment request message, and the verification device may use the information in the payment request message as part of generating an authorization response, e.g., by transmitting the authentication (verification) to a processing network or to an authorization server that uses the authentication to prepare the authorization response.

E. Approximate Trapdoors

Figure 5A:
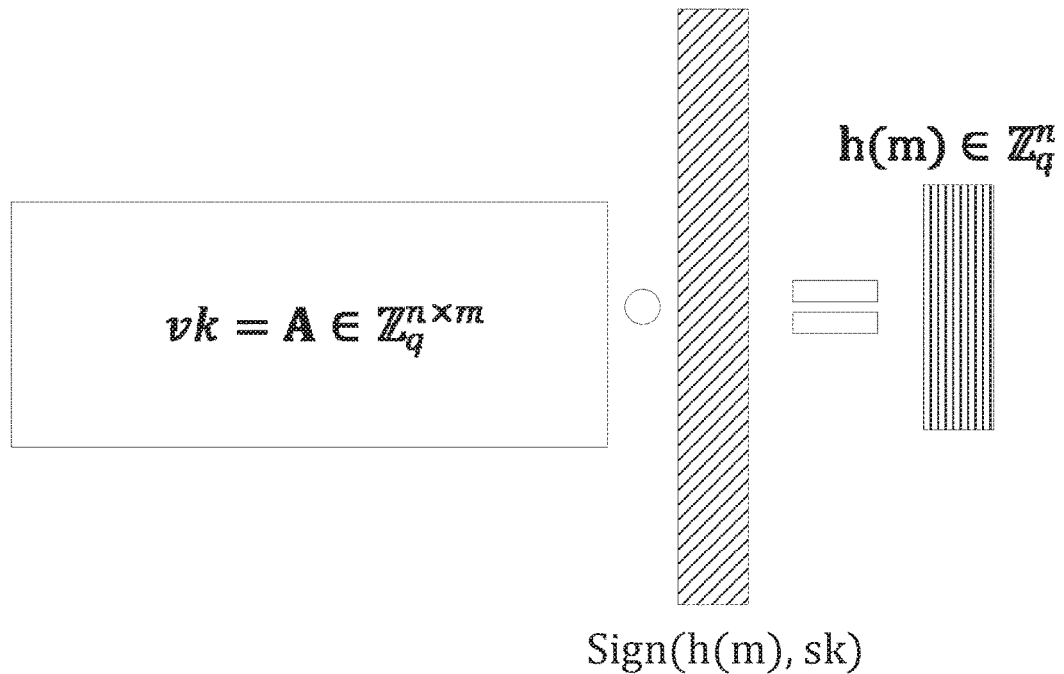
FIG. 5A-B show a simplified diagram of signature verification with exact trapdoors and approximate trapdoors in lattice-based signing systems.
Figure 5B:
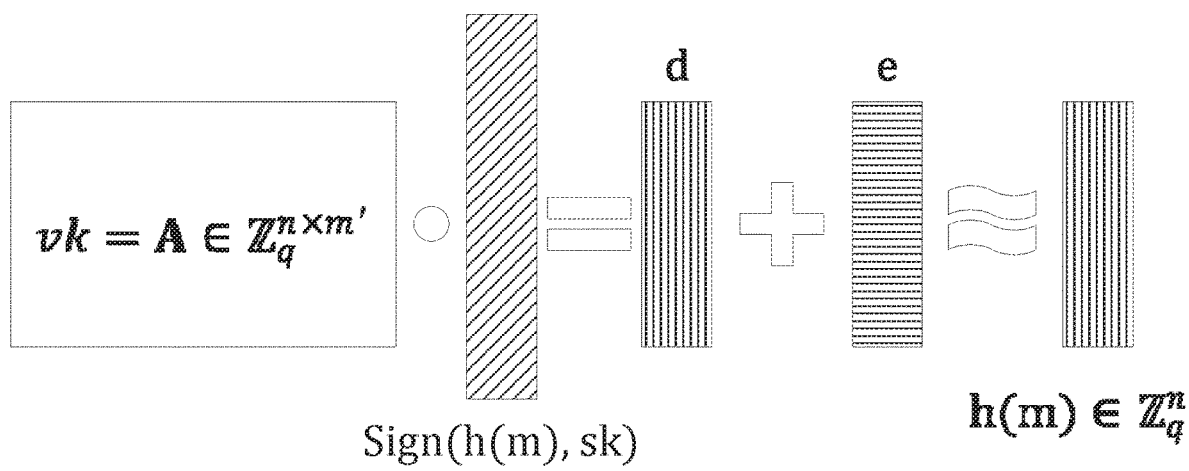

FIG. 5 depicts signature verification with an exact trapdoor scheme and with an approximate trapdoor scheme. FIG. 5A shows an example calculation for verification of a signature generated with an exact trapdoor. FIG. 5B shows an example calculation for verification of a signature generated with an approximate trapdoor.

In FIG. 5A, a verification matrix A, that has dimensions n×m, can be multiplied by a signature vector Sign(h(m), sk), that is generated with a secret key sk and a hashed message h(m). Each entry of the verification matrix may be in $\mathbb{Z}_q$. In some embodiments, n may be a security parameter, such as 128. q may be set to $n\sqrt{n}$. The signature vector Sign(h(m), sk) has dimension m, and is chosen such that when it is multiplied by the verification matrix A, it results in the hashed message. The hashed message is a vector with n dimensions. By hashing the message, the size of n and m can be fixed instead of depending on the size of the message. Note that if m is relatively large, then both the verification matrix A and the signature vector Sign(h(m), sk) will be large.

FIG. 5B depicts the effects of a verification matrix A with smaller dimension. The verification matrix A may now have dimensions n×m', where m'<n+m. Using an approximate trapdoor can allow the dimensions to be reduced. Because m' is smaller, the associated signature vector for a hashed message (still of length n) is smaller as well. However, by using an approximate trapdoor, the product d of the matrix multiplication may be the hashed message h(m), plus an error vector e. The verification matrix A can be constructed such that the error vector e is small, that is, the length of the error vector e is less than n. Therefore the condition for verification is that the product d is within known error bounds of the hashed message. A fraudulent signature may result in a product d that differs from the hashed message by a large amount, and thus the verification process can still be secure.

We can now discuss in more detail the difference between approximate trapdoors and exact trapdoors.

Given a public matrix $A \in \mathbb{Z}_q^{n \times m}$ where m=O(n log q), and a target y. We call a vector $x \in \mathbb{Z}^m$ an approximate short preimage of y if $$A \cdot x = y + z \pmod{q}$$

for some $z \in \mathbb{Z}^n$, and both x and z are short. An approximate trapdoor for A is defined to be a string that allows its owner to efficiently find an approximate short preimage given a target y.

To make sense of the word "trapdoor", we can argue that solving the approximate version of ISIS is hard without the trapdoor. Under proper settings of parameters, we show the approximate ISIS problem is as hard as the standard ISIS problem, or no easier than LWE. The reductions extensively use the Hermite normal form (HNF) and are pretty straightforward.

The approximate ISIS problem and the approximate trapdoor are natural generalizations of their exact variants. Indeed, both notions have been used in the literature, at least on an informal level. For example, the approximate ISIS problem was used in the work of Bai et al. [BGLS19] to improve the combinatorial algorithms of the exact ISIS problem.

For the approximate trapdoor, an exact trapdoor of a public matrix in the HNF, say a trapdoor for $A=[I_n|A']$, can be used as an approximate trapdoor for A'. Such a method was often used in the implementation of signatures to decrease the sizes of the public key and the signature by a dimension of n. Our goal is thus to further reduce the sizes compared to the HNF approach, while preserving the quality of the trapdoor, i.e. at least not increasing the norm of the preimage.

One contribution of embodiments is to show that the gadget trapdoor (G-trapdoor) proposed by Micciancio and Peikert [MP12] can be modified to an approximate trapdoor, in a way that further reduces the sizes of the public matrix, the trapdoor, and the preimage. An aspect of the G-trapdoor is a specific "gadget" matrix of base b, $$G := I_n \otimes g^t := I_n \otimes (1, b, \ldots, b^{k-1}) \in \mathbb{Z}^{n \times (nk)}$$

where $k := \lceil \log_b q \rceil$. The base b is can be chosen as 2 for simplicity, or a larger value in practical implementations.

Micciancio and Peikert [MP12] show how to generate a random matrix A together with a matrix D of small norm such that $A \cdot D = G \pmod{q}$. In particular, A can be designed as $$A = [\bar{A}|G - \bar{A}R]$$

where R is a matrix with small entries and is the actual trapdoor. The matrix D is then equal to $$\begin{bmatrix} R \\ I_{nk} \end{bmatrix}.$$

Since the kernel of the G matrix has a public short basis, one can first solve the ISIS problem under the public matrix G, then use D to solve the ISIS problem under the public matrix A.

We observe that if we drop a few (say l) entries corresponding to the small powers of b from the gadget matrix G, i.e. let the following F matrix be a reduced gadget matrix $$F := I_n \otimes f^t := I_n \otimes (b^l, \ldots, b^{k-1}) \in \mathbb{Z}^{n \times n(k-l)};$$

then we are still able to solve the ISIS problem with respect to the public matrix F up to a $b^l$-approximation of the solution (i.e., the norm of the error vector is proportional to $b^l$). Replacing G by F in A gives $$A=[\bar{A}|F-\bar{A}R]$$

Then the dimensions of the trapdoor R and the public matrix A can be reduced.

Given a public matrix A together with its approximate G-trapdoor R, finding an arbitrary approximate short preimage of a given target u is quite straightforward, but sampling the preimage from a trapdoor-independent distribution can be non-trivial. As mentioned, the ability to sample from a trapdoor-independent distribution is involved in many of the trapdoor applications including digital signatures.

We provide an algorithm that samples an approximate short preimage from a trapdoor-independent distribution. The algorithm itself can build on the perturbation-based discrete Gaussian sampler from [MP12], but the analyses of the preimage distribution from [MP12] are not easy to generalize. Our analyses of the preimage distribution and the approximation error distribution extensively use a linear transformation theorem on lattice distributions (cf. Theorem 2.7, implicitly used in [MP12, MP13, BPMW16]).

While our algorithm works for target images $u \in \mathbb{Z}_q^n$ and does not cause any blow up in the standard deviation of the distribution, the analysis of trapdoor-independence only applies to a target image u sampled uniformly from $\mathbb{Z}_q^n$, as opposed to the analysis for the exact trapdoor in [GPV08, MP12] which is able to spell out the distribution of the preimages of all the $u \in \mathbb{Z}_q^n$. To briefly explain the reason for this gap, we observe that the methods we have tried to handle all the target images require significant increases in the smoothing parameters of the lattice intersections required in the linear transformation theorem (Theorem 2.7). In other words, the norm of the resulting preimage increases significantly rendering the result meaningless.

Still, sampling the approximate preimages for uniform targets from a trapdoor-independent distribution suffices for replacing the use of exact lattice trapdoors in many cryptosystems, including the hash-and-sign signature [GPV08], IBE [GPV08, ABB10, CHKP12], ABE [GVW13], and the special purpose obfuscation schemes [GKW17, WZ17], the private-constrained PRF and the reusable garbled circuits [CC17, CVW18] built on the GGH15 graded encoding scheme [GGH15].

We now explain the efficiency gain of using our approximate trapdoor compared to the exact trapdoor and the other existing optimization techniques, with a focus on the signature application. Our goal is to set the parameters to achieve the following "win-win-win" scenario: 1) save on the preimage size (bandwidth); 2) save on the size for the public matrix A; and 3) retain, or even gain, concrete security, which is related to the discrete Gaussian width of the preimage and the norm of the error term.

Let us start with an understanding of the dependency of the savings on the variable l, i.e, the number of entries dropped from the gadget g. In Table 1 we provide a comparison of the parameters between the exact G-trapdoor of [MP12] and the approximate G-trapdoor samplers in this paper. In both cases the public matrices are instantiated in the pseudorandom mode. For the approximate trapdoor, the dimension of the trapdoor decreases from nk to n(k−l). The dimension m of the public matrix and the preimage decreases. The width s of the preimage distribution also decreases slightly following the decreasing of m. However, the norm of the error factor in the image grows with l. So in the concrete instantiation of the hash-and-sign signature discussed later, we need to coordinate the value of l with the norms of the preimage and the error, which can determine the security estimation together.

Our algorithm inherits the O(log q)-space, O(n log q)-time G-preimage sample subroutine from [MP12, GM18]. So the saving of space and time in the sampling of the perturbation is proportional to the saving in the dimension m.

Let us make a quick remark for the applications beyond signatures. The saving of the dimension m is of significant importance to the applications built on the GGH15 graded encoding scheme (implemented in [HHSS17, CGM+18]). In those applications, the modulus q is proportional to $M^d$ (where $d \in \mathbb{N}$ is the number of "levels" of the graded encodings; larger d supports richer functionalities). So reducing the dimension m would dramatically reduce the overall parameters.

TABLE 1

A brief comparison of the parameters.

| Parameters | Exact G-trapdoor | Approximate G-trapdoor |
|---|---|---|
| m | n(2 + k) | n(2 + (k − l)) |
| σ | $\sqrt{b^2 + 1} \cdot \omega(\sqrt{\log n})$ | $\sqrt{b^2 + 1} \cdot \omega(\sqrt{\log n})$ |
| s | $C \cdot \tau \cdot (\sqrt{m} + 2\sqrt{n}) \cdot \sigma$ | $C \cdot \tau \cdot (\sqrt{m} + 2\sqrt{n}) \cdot \sigma$ |
| v | 0 | $b^l \cdot \sigma$ |

The parameters in table 1 are derived under a fixed lattice dimension n, a fixed modulus $q \geq \sqrt{n}$, and a fixed base b. Let $k = \lceil \log_b q \rceil$. Let l denote the number of entries removed from g ($1 \leq l < k$). Then we list m as the dimension of the public matrix and the preimage; a as the width of the gadget preimage distribution; s as the width of the final preimage distribution (where C>0 is a universal constant; τ as the width, or subgaussian parameter, of the distribution of the entries in the trapdoor); v as the length bound of the error for each entry in the image. Note that some embodiments may use δ in place of τ.

F. Example Parameters for the Signatures

We give a proof-of-concept implementation of the hash-and-sign signature based on our approximate trapdoor. The security is analyzed in the random oracle model, assuming the hardness of RingLWE for the pseudorandomness of the public key and RingSIS for the unforgeability of the signature. Here we provide a short summary and leave more details in Section 5.2.

FIG. 6 shows a summary table of concrete parameters according to some embodiments. Let us first remark that different implementation results of the hash-and-sign signatures [BB13, BFRS18, GPR+18] possibly use different ways of measuring sizes and security, and not all the details are recoverable from the papers. So we also include our reference implementation of the exact trapdoor as a fair comparison. For an estimation of 100-bit security, our reference implementation for the exact trapdoor under the modulus q $2^{24}$ and base b=2 matches the parameters reported in [BB13].

We also use smaller moduli and bigger bases to reduce the size and increase the security level. The parameters in FIG. 6 suggest that for the 3 choices of q and b, using the approximate gadget trapdoor by setting $l = \lceil (\log_b q)/2 \rceil$ saves about half of the sizes in the public key and signatures comparing to using the exact trapdoor, with even a slight increase in the security estimation.

Our implementation shows that the sizes of the public-key & signature can be reduced to 5 kB & 4.45 kB for an estimation of 100-bit security, and 11.25 kB & 9.38 kB for an estimation of 192-bit security. Those are much closer to the sizes of the signatures based on the rejection sampling approach [Lyu12, BG14, DKL+18, ABB+19]. As a reference, the sizes of the public-key & signature for qTESLA [ABB+19] are 4.03 kB & 3.05 kB for an estimation of 128-bit security, and 8.03 kB & 6.03 kB for an estimation of 192-bit security. The sizes for Dilithium [DKL+18] are even smaller. Let us remark that our implementation has not used many low-level optimizations like Dilithium [DKL+18] and qTESLA [ABB+19]. So it is reasonable to expect we have more room to improve after adding lower-level optimizations. The parameters for Falcon [FHK+18] are the smallest due to the use of NTRU lattices, so they are rather incomparable with the ones based on RingLWE.

There are many folklore optimizations regarding trapdoors for Ajtai's one-way function. We discuss the comparison and compatibility of a few of them with our construction. Throughout these comparisons we are concerned with the "win-win-win" scenario mentioned in the beginning.

First is the approximate trapdoor from the HNF optimization: $A=[I|A']$. This barely achieves the "win-win-win" scenario with a slight savings on the public key and the signature. Our construction can be used in the pseudorandom-mode of the gadget trapdoor which has automatically included the HNF optimization, and saves around 50% in addition.

Our method can also be used together with any base in the gadget, including a large base of size $b \approx \sqrt{q}$ (the resulting gadget is $g=[1, \sqrt{q}]$), as was used in [dPLS18] when the modulus is large. This construction suffers from a large Gaussian width ($\sqrt{q}$), which can hurts concrete security and may be infeasible in the smaller modulus regime we implement in Section 5. Specifically for the smaller moduli, the signature's Gaussian width is larger than the modulus, as was confirmed both on paper and in our experiments. So we use a moderately large base b.

One may also try to construct a short integer matrix S for $A:=[(I, \overline{A}')|F-(I, \overline{A}')R]$ (corresponds to the pseudorandom public key in Eqn. (1)) such that $AS=G$, and hope this view provides a better approximate trapdoor. From here, the hash-and-sign signature scheme is to return $Sz+p$ where p is a perturbation and z is a G-lattice sample. However, such a matrix S requires a $b'$ term. So this method does save on the public key, but does not improve the signature size and, most importantly, increases the Gaussian width by a factor of $b'$. The increase of the width decreases the concrete security of the underlying SIS problem. In fact, to achieve the same saving in the public key, one can instead directly increase the base from b to $b'$ in the gadget.

II. PRELIMINARIES

Before describing specific examples in detail, we can describe aspects of lattice-based cryptosystems that may be utilized in embodiments of the present disclosure.

A. Notations and Terminology

In cryptography, the security parameter (denoted as $\lambda$) is a variable that is used to parameterize the computational complexity of the cryptographic algorithm or protocol, and the adversary's probability of breaking security. An algorithm is "efficient" if it runs in (probabilistic) polynomial time over $\lambda$.

When a variable v is drawn uniformly random from the set S we denote as $v \leftarrow U(S)$. We use $\approx_s$ and $\approx_c$ as the abbreviations for statistically close and computationally indistinguishable. For two distributions $D_1$, $D_2$ over the same support X, we denote $D_1 \stackrel{\varepsilon}{\approx} D_2$ to denote that each $x \in X$ has $D_1(x) \in [1\pm\varepsilon]D_2(x)$ and $D_2(x) \in [1\pm\varepsilon]D_1(x)$.

Let $\mathbb{R}$, $\mathbb{Z}$, $\mathbb{N}$ be the set of real numbers, integers and positive integers. Denote $\mathbb{Z}/(q\mathbb{Z})$ by $\mathbb{Z}_q$. For $n \in$, $[n] := 1, \ldots, n$. A vector in $\mathbb{R}$ (represented in column form by default) is written as a bold lower-case letter, e.g. v. For a vector v, the $i^{th}$ component of v will be denoted by $v_i$. For an integer base $b > 1$, we call a positive integer's "b-ary" decomposition the vector $(q_0, q_1, \ldots, q_{k-1}) \in \{0, \ldots, b-1\}^k$ where $k := \lceil \log_b q \rceil$, and $q = \Sigma q_i b^i$.

A matrix is written as a bold capital letter, e.g. A. The $i^{th}$ column vector of A is denoted $a_i$. The length of a vector is the $\ell_p$-norm $\|v\|_p := (\Sigma v_i^p)^{1/p}$, or the infinity norm given by its largest entry $\|v\|_\infty := \max_i\{|v_i|\}$. The length of a matrix is the norm of its longest column: $\|A\|_p := \max_i \|a_i\|_p$. By default we use $\ell_2$-norm unless explicitly mentioned. When a vector or matrix is called "small" or "short", we refer to its norm but not its dimension, unless explicitly mentioned. The thresholds of "small" or "short" can be precisely parameterized when necessary. The notations [A B], [A, B], and [A|B] can all denote that a matrix A is augmented or concatenated horizontally with a second matrix B. The notation $$\begin{bmatrix} A \\ B \end{bmatrix}$$

can denote mat matrices A and is are vertically concatenated, and may also be called a stack.

B. Linear Algebra

Let $\{e_i\}_{i=i}^n$ be the canonical basis $\mathbb{R}^n$, with entries $\delta(j, k)$ where $\delta(j, k)=1$ when $j=k$ and 0 otherwise. For any set $S \subseteq \mathbb{R}^n$, its span (denoted as span(S)) is the smallest subspace of $\mathbb{R}^n$ containing S. For a matrix, $M \in \mathbb{R}^{n \times m}$, its span is the span of its columns vectors, written as span(M). We write matrix transpose as $M^t$. Let $\tilde{B}$ denote the Gram-Schmidt orthogonalization of B. The GSO of an ordered basis $B=[b_1, \ldots, b_k]$ is assumed to be from left to right, $\tilde{b_1}=b_1$, unless stated otherwise.

Recall M's singular value decomposition (SVD), i.e. $M=VDW \in \mathbb{R}^{n \times m}$ where $V \in \mathbb{R}^{n \times n}$ along with $W \in \mathbb{R}^{m \times m}$ are unitary, and $D \in \mathbb{R}^{n \times m}$ is a triangular matrix containing M's singular values. Further, let $q=\min\{n, m\}$ and $D_q=\text{diag}(s_1, \ldots, s_q)$ be the diagonal matrix containing M's singular values $\{0 \leq s_i\}$. Then, $D=D_q$ when $n=m$, $D=[D_q \, 0]$ when $m > n$, and $$D = \begin{bmatrix} D_q \\ 0 \end{bmatrix}$$

in the case m<n.

A symmetric matrix $\Sigma \in \mathbb{R}^{n \times n}$ is positive semi-definite if for all $\vec{x} \in \mathbb{R}^n$, we have $\vec{x}^t \Sigma \vec{x} \geq 0$. It is positive definite, $\Sigma > 0$, if it is positive semi-definite and $\vec{x}^t \vec{x} = 0$ implies $\vec{x} = 0$. We say $\Sigma_1 > \Sigma_2 (\geq)$ if $\Sigma_1 - \Sigma_2$ is positive-(semi)definite. This forms a partial ordering on the set of positive semi-definite matrices, and we denote $\Sigma \geq \alpha 1$ often as $\Sigma \geq \alpha$ for constants $\alpha \in \mathbb{R}^+$. For any positive semi-definite matrix $\Sigma$, we write $\sqrt{\Sigma}$ to be any full rank matrix T such that $\Sigma = TT^t$. We say T is a square root of $\Sigma$. For two positive semi-definite matrices, $\Sigma_1$ and $\Sigma_2$, we denote the positive semi-definite matrix formed by their block diagonal concatenation as $\Sigma_1 \oplus \Sigma_2$. Let M* denote Hermitian transpose. The (Moore-Penrose) pseudoinverse for matrix M with SVD M=VDW is $M^+ = WD^+V^*$ where $D^+$ is given by transposing D and inverting M's nonzero singular values. For example, T=sI and $T^+ = s^{-1}I$ for a covariance $\Sigma = s^2 I$. (An analogous $T^+$ is given for the non-spherical, full-rank case $\Sigma > 0$ using $\Sigma$'s diagonalization.)

C. Lattices Background

An n-dimensional lattice of rank k≤n is a discrete additive subgroup of $\mathbb{R}^n$. Given k linearly independent basis vectors $B = b_1, \ldots, b_k \in \mathbb{Z}^n$, the lattice generated by B is $$(B) = (b_1, \ldots, b_k) = \{\sum_{i=1}^{k} x_i \cdot b_i, x_i \in \mathbb{Z}\}.$$

Given n, $m \in \mathbb{Z}_q^{n \times m}$, and a modulus $q \geq 2$, we often use q-ary lattices and their cosets, denoted as for $A \in \mathbb{Z}_q^{n \times m}$, denote $\Lambda^\perp[A]$ or $\Lambda_q^\perp[A]$ as $\{x \in \mathbb{Z}^m : A \cdot x = 0 \pmod{q}\}$;

for $A \in \mathbb{Z}_q^{n \times m}, w \in \mathbb{Z}_q^n$, denote $\Lambda_w^\perp[A]$ as $\{x \in \mathbb{Z}^m : A \cdot x = w \pmod{q}\}$.

We can define Gaussians on lattices. For any $s > 0$ define the Gaussian function on $\mathbb{R}^n$ with parameter s:

$$\forall x \in \mathbb{R}^n, \rho_s(x) = e^{-\pi \|x\|^2/s^2}.$$

For any $c \in \mathbb{R}^n$, real $s > 0$, and n-dimensional lattice $\Lambda$, define the discrete Gaussian distribution $D_{\Lambda+c,s}$ as:

$$\forall x \in \Lambda + c, D_{+c,s}(x) = \frac{\rho_s(x)}{\rho_s(\Lambda + c)}.$$

The subscripts s and c are taken to be 1 and 0 (respectively) when omitted.

For any positive semidefinite $\Sigma = T \cdot T^t$, define the non-spherical Gaussian function as $$\forall x \in \text{span}(T) = \text{span}(\Sigma), \rho_T(x) = e^{-\pi x^t \Sigma^+ x},$$

and $\rho_T(x) = 0$ for all $x \notin \text{span}(\Sigma)$. Note that $\rho_T(\cdot)$ only depends on $\Sigma$ but not the specific choice of the T, so we may write $\rho_T(\cdot)$ as $\rho_{\sqrt{\Sigma}}(\cdot)$.

For any $c \in \mathbb{R}^n$, any positive semidefinite $\Sigma$, and n-dimensional lattice $\Lambda$ such that $(\Lambda + c) \cap \text{span}(\Sigma)$ is non-empty, define the discrete Gaussian distribution $D_{\Lambda+c,\sqrt{\Sigma}}$ as:

$$\forall x \in \Lambda + c, D_{\Lambda+c,\sqrt{\Sigma}}(x) = \frac{\rho_{\sqrt{\Sigma}}(x)}{\rho_{\sqrt{\Sigma}}(\Lambda + c)}.$$

Such a discrete Gaussian distribution may be referred to as a lattice Gaussian distribution.

We recall the definition of smoothing parameter and some useful facts.

Definition 2.1 [Smoothing parameter [MR07]] For any lattice $\Lambda$ and positive real $\varepsilon > 0$, the smoothing parameter $\eta_\varepsilon(\Lambda)$ is the smallest real $s > 0$ such that $\rho_{1/s}(\Lambda^* \setminus \{0\}) \leq \varepsilon$.

Notice that for two lattices of the same rank $\Lambda_1 \subseteq \Lambda_2$, the denser lattice always has the smaller smoothing parameter, i.e. $\eta_\varepsilon(\Lambda_2) \leq \eta_\varepsilon(\Lambda_1)$. We can also use a generalization of the smoothing parameter to the non-spherical Gaussian.

Definition 2.2 For a positive semi-definite $\Sigma = TT^t$, an $\varepsilon > 0$, and a lattice $\Lambda$ with $\text{span}(\Lambda) \subseteq \text{span}(\Sigma)$, we say $\eta_\varepsilon(\Lambda) \leq \sqrt{\Sigma}$ if $\eta_\varepsilon(T^+\Lambda) \leq 1$.

When the covariance matrix $\Sigma > 0$ and the lattice $\Lambda$ are full-rank, $\sqrt{\Sigma} \geq \eta_\varepsilon(\Lambda)$ is equivalent to the minimum eigenvalue of $\Sigma$, $\lambda_{min}(\Sigma)$, being at least $\eta_\varepsilon^2(\Lambda)$.

Lemma 2.3 [Smoothing parameter bound from [GPV08]] For any n-dimensional lattice (B) and for any $\omega(\sqrt{\log n})$ function, there is a negligible $\varepsilon(n)$ for which The following is a generalization of [GPV08, Corollary 2.8] for non-spherical Gaussian.

Corollary 2.5 [Smooth over the cosets] Let $\Lambda, \Lambda'$ be n-dimensional lattices s.t. $\Lambda' \subseteq \Lambda$. Then for any $\varepsilon > 0$, $\sqrt{\Sigma} \geq \eta_\varepsilon(\Lambda')$, and $c \in \text{span}(\Lambda)$, we have $$\Delta(D_{\Lambda+c,\sqrt{\Sigma}} \bmod', U(\Lambda \bmod \Lambda')) < 2\varepsilon$$

Lemma 2.6. [[PR06, MR07]] Let B be a basis of an n-dimensional lattice, and let $s \geq \|B\| \cdot \omega(\log n)$, then $\Pr_{xD_{1s}}[\|x\| \geq s \cdot \sqrt{n} \vee x = 0] \leq (n)$.

We can use the following general theorem regarding the linear transformation, T, of a discrete gaussian. It states that as long as the original discrete gaussian is smooth enough it the kernel of T, then the distribution transformed by T is statistically close to another discrete Gaussian.

Theorem 2.7 For any positive definite $\Sigma$, vector c, lattice coset $A := \Lambda + a \subseteq c + \text{span}(\Sigma)$, and linear transformation T, if the lattice $\Lambda_T = \Lambda \cap \ker(T)$ satisfies $\text{span}(\Lambda_T) = \ker(T)$ and $\eta_\varepsilon(\Lambda_T) \leq \sqrt{\Sigma}$, then $$T(D_{A,c,\sqrt{\Sigma}}) \stackrel{\bar{\varepsilon}}{\approx} D_{TA,Tc,T\sqrt{\Sigma}}$$

where $\bar{\varepsilon} = 2\varepsilon/(1-\varepsilon)$. Let us remark that if T is injective (i.e. ker(T) is trivial), then $T(D_{A,c,\sqrt{\Sigma}}) = D_{TA,Tc,T\sqrt{\Sigma}}$.

D. Gadgets, or G-Lattices

Let $G = I_n \otimes g^t \in \mathbb{Z}_q^{n \times nk}$ with $g^t = (1, b, \ldots, b^{k-1}) k = \lceil \log_b q \rceil$. G is commonly referred to the gadget matrix. The gadget matrix's q-ary lattice, $\Lambda_q^\perp(G)$, is the direct sum of n copies of the lattice $\Lambda_q^\perp(g^t)$. Further, $\Lambda_q^\perp(g^t)$ has a simple basis, $$B_q = \begin{bmatrix} b & & & q_0 \\ -1 & \ddots & & \vdots \\ & \ddots & b & q_{k-2} \\ & & -1 & q_{k-1} \end{bmatrix}$$

where $(q_0, \ldots, q_{k-1}) \in \{0, 1, \ldots, b-1\}^k$ is the b-ary decomposition of the modulus, q. When $q = b^k$, we can set $q_0 = q_1 = \ldots = q_{k-2} = 0$ and $q_{k-1} = b$. Either way, the integer cosets of $\Lambda_q^\perp(g^t)$ can be viewed as the syndromes of $g^t$ as a check matrix, in the terminology of coding theory. These cosets are expressed as $\Lambda_u^\perp(g^t)=\{x\in \mathbb{Z}^k:g^t x=u \bmod q\}=\Lambda_q^\perp(g^t)+u$ where u can be any coset representative. A simple coset representative of $\Lambda_u^\perp(g^t)$ is the b-ary decomposition of u. The integer cosets of $\Lambda_q^\perp(G)$ are expressed through the direct-sum construction, $\Lambda_u^\perp(G)=\Lambda_{u_0}^\perp(g^t)\oplus \ldots \oplus \Lambda_{u_n}^\perp(g^t)$ where $u=(u_1, \ldots, u_n)\in \mathbb{Z}_q^n$. We call G a gadget matrix since the following problems, SIS and LWE, are easily solved on the matrix G [MP12].

As an example, consider a gadget matrix G with base b=2, q=8 (and thus k=3), and n=3. The gadget matrix is then $G=I_3\otimes g^t\in \mathbb{Z}_8^{3\times 9}$ with $g^t=(1, 2, 2^2)$, or $$G = \begin{bmatrix} 1 & 2 & 4 & 0 & 0 & 0 & 0 & 0 & 0 \\ 0 & 0 & 0 & 1 & 2 & 4 & 0 & 0 & 0 \\ 0 & 0 & 0 & 0 & 0 & 0 & 1 & 2 & 4 \end{bmatrix}$$

We can then form a reduced gadget matrix F by dropping the l columns with the smallest powers b from the gadget matrix G. For example, if l=1, then this corresponds to dropping any column with a 1. The reduced gadget matrix is thus $$F = \begin{bmatrix} 2 & 4 & 0 & 0 & 0 & 0 \\ 0 & 0 & 2 & 4 & 0 & 0 \\ 0 & 0 & 0 & 0 & 2 & 4 \end{bmatrix}$$

E. SIS and LWE

We first recall the short integer solution (SIS) problem.

Definition 2.8 [SIS [Ajt96]] For any n, m, $q\in \mathbb{Z}$ and $\beta\in \mathbb{R}$, define the short integer solution problem $SIS_{n,m,q}$ as follows: Given $A\in \mathbb{Z}_q^{n\times m}$, find a non-zero vector $x\in \mathbb{Z}^m$ such that $\|x\|\leq \beta$, and $Ax=0 \bmod q$.

Definition 2.9 [ISIS] For any n, m, $q\in$ and $\in$, define the inhomogeneous short integer solution problem $ISIS_{n,m,q}$ as follows: Given $A\in \mathbb{Z}_q^{n\times m}$, $y\in \mathbb{Z}_{q_n}$, find $x\in \mathbb{Z}^m$ such that $\|x\|\leq \beta$, and $Ax=y \bmod q$.

Lemma 2.10 [Hardness of (I)SIS based on the lattice problems in the worst case [Ajt96, MR07, GPV08]] For any m=poly(n), any $\beta>0$, and any sufficiently large $q\geq \beta\cdot\text{poly}(n)$, solving $ISIS_{n,m,q,\beta}$ or $ISIS_{n,m,q,\beta}$ (where aryy is sampled uniformly from $\mathbb{Z}_q^n$) with non-negligible probability is as hard as solving $GapSVP_\gamma$ and $SIVP_\gamma$ on arbitrary n-dimensional lattices with overwhelming probability, for some approximation factor $\gamma=\beta\cdot\text{poly}(n)$.

All the (I)SIS problems and their variants admit the Hermite normal form (HNF), where the public matrix A is of the form $[I_n|A']$ where $A'\in \mathbb{Z}_q^{m-n}$. The HNF variant of (I)SIS is as hard as the standard (I)SIS. This can be seen by rewriting $A\in \mathbb{Z}_q^{n\times m}$ as $A=:[A_1|A_2]=A_1\cdot[I_n|A_1^{-1}\cdot A_2]$ (we may work with n, q such that $A_1\leftarrow U(\mathbb{Z}_q^{n\times n})$ is invertible with non-negligible probability).

We can also recall the decisional learning with errors (LWE) problem.

Definition 2.11 [Decisional learning with errors [Reg09]] For n, $m\in$ and modulus $q\geq 2$, distributions for secret vectors, public matrices, and error vectors $\theta$, $\pi$, $\chi\subseteq \mathbb{Z}_q$. An LWE sample is obtained from sampling $s\leftarrow \theta^n$, $A\leftarrow \pi^{n\times m}$, $e\leftarrow \chi^m$, and outputting $(A, y^t:=s^t A+e^t \bmod q)$.

We say that an algorithm solves $LWE_{n,m,q,\theta,\pi,\chi}$ if it distinguishes the LWE sample from a random sample distributed as $\pi^{n\times m}\times U(\mathbb{Z}_q^m)$ with probability greater than ½ plus non-negligible.

Lemma 2.12 [Hardness of LWE based on the lattice problems in the worst case [Reg09, Pei09, BLP+13, PRS17]] Given $n\in \mathbb{N}$, for any m=poly(n), $q\leq 2^{poly(n)}$. Let $\theta=\pi=U(\mathbb{Z}_q)$, $\chi=D_{\mathbb{Z},s}$ where $s\geq 2\sqrt{n}$. If there exists an efficient (possibly quantum) algorithm that breaks $LWE_{n,m,q,\theta,\pi,\chi}$, then there exists an efficient (possibly quantum) algorithm for solving $GapSVP_\gamma$ and $SIVP_\gamma$ on arbitrary n-dimensional lattices with overwhelming probability, for some approximation factor $\gamma=\tilde{O}(nq/s)$.

The next lemma shows that LWE with the secret sampled from the error distribution is as hard as the standard LWE.

Lemma 2.13 [[ACPS09, BLP+13]] For n, m, q, s chosen as was in Lemma 2.12, $LWE_{n,m',q,D_{\mathbb{Z},s},U(\mathbb{Z}_q),D_{\mathbb{Z},s}}$ is as hard as $LWE_{n,m,q,U(\mathbb{Z}_q),U(\mathbb{Z}_q),D_{\mathbb{Z},s}}$ for m'≤m−(16n+4 log log q).

The (I)SIS and LWE problems bear similarities. It is sometimes convenient to talk about one of the two problems, and an analogous result immediately applies for the other. On a high level they can be considered equally hard, since breaking one of them would morally break the other. But a careful examine of the current status of the reductions suggests that LWE is a stronger assumption than (I)SIS. Since if there is a polynomial time algorithm that solves the SIS problem with respect to a public matrix $A\in \mathbb{Z}^{n\times m}$, we can simply use the SIS solution x to break the decisional LWE problem by computing the inner-product of x and the LWE challenge vector y; on the other hand, given a polynomial time algorithm that solves the LWE problem, we know of a more involved polynomial time quantum algorithm that solves SIS [SSTX09].

Nevertheless, a trapdoor for a public matrix $A\in \mathbb{Z}^{n\times m}$ is defined in [Ajt99, GPV08] as anything that allows us to efficiently solve both the (I)SIS and LWE problems w.r.t. A.

III. APPROXIMATE TRAPDOOR FOR AJTAI'S FUNCTION

Given a matrix $A\in \mathbb{Z}_q^{n\times m}$, define an approximate trapdoor of A as anything that allows us to efficiently solve the approximate version of the ISIS problem w.r.t. A. We first define the approximate ISIS problem.

Definition 3.1 (Approximate ISIS) For any n, m, $q\in \mathbb{N}$ and $\alpha$, $\beta\in \mathbb{R}$, define the approximate inhomogeneous short integer solution problem Approx.$ISIS_{n,m,q,\alpha,\beta}$ as follows: Given $A\in \mathbb{Z}_q^{n\times m}$, $y\in \mathbb{Z}_q^n$, find a vector $x\in \mathbb{Z}^m$ such that $\|x\|\leq \beta$, and there is a vector $z\in \mathbb{Z}^n$ satisfying $\|z\|\leq \alpha$ and $Ax=y+z \pmod{q}$.

That is to say, given a verification matrix A and a message (or hash) y, the approximate ISIS relates to the problem of finding a signature vector x such that Ax=y with a small error z. Let us remark that the approximate ISIS is only non-trivial when the bounds $\alpha$, $\beta$ are relatively small compared to the modulus q. Also, our definition chooses to allow the zero vector to be a valid solution, which means when $\|y\|\leq\alpha$, the zero vector is trivially a solution. Such a choice does not cause a problem since the interesting case in the application is to handle all the $y\in\mathbb{Z}_q^n$ or y sampled uniformly from $\mathbb{Z}_q^n$.

Definition 3.2 (Approximate trapdoor) A string $\tau$ is called an $(\alpha, \beta)$-approximate trapdoor for a matrix $A\in\mathbb{Z}_q^{n\times m}$ if there is a polynomial time algorithm (in n, m, log q) that given $\tau$, A and any $y\in\mathbb{Z}_q^n$, outputs a non-zero vector $x\in\mathbb{Z}^m$ such that $\|x\|\leq\beta$, and there is a vector $z\in\mathbb{Z}^n$ satisfying $\|z\|\leq\alpha$ and $Ax=y+z\pmod{q}$.

To make sense of the approximate trapdoor, we argue that for those who do not have the trapdoor, the approximate ISIS problem is a candidate one-way function under proper settings of parameters.

First, we observe a rather obvious reduction that bases the hardness of approximate ISIS on the hardness of decisional LWE with low-norm secret (e.g. when the secret is sampled from the error distribution). In the theorem statement below, when the norm symbol is applied on a distribution D, i.e. $\|D\|$, it denotes the lowest value $v\in\mathbb{R}^+$ such that $\Pr_{d\leftarrow D}[\|d\|<v]>1-\text{negl}(\lambda)$.

Theorem 3.3 For n, m, $q\in\mathbb{Z}$, $\alpha$, $\beta\in\mathbb{R}^+$, $\theta$, $\pi$, $\chi$ be distributions over $\mathbb{Z}$ such that $q>4(\|\theta\|\cdot(\alpha+1)+\|\theta^n\|\cdot\alpha+\|\chi^m\|\cdot\beta)$. Then $\text{LWE}_{n,m,q,\theta,\pi,\chi}\leq_p \text{Approx.ISIS}_{n,m,q,\alpha,\beta}$.

Proof. Suppose there is a polynomial time adversary A that breaks Approx.ISIS$_{n,m,q,\alpha,\beta}$, we build a polynomial time adversary B that breaks decisional LWE.

Let $r=\lfloor\alpha\rfloor+1$. Given an LWE challenge $(A, w)\in\mathbb{Z}_q^{n\times m}\times\mathbb{Z}_q^m$, where w is either an LWE sample or sampled uniformly from $\mathbb{Z}_q^m$. B picks a vector $y:=(r, 0, \ldots, 0)^t\in\mathbb{Z}_q^n$, sends A and y to the adversary A as an approximate ISIS challenge. A replies with $x\in\mathbb{Z}^m$ such that $\|x\|\leq\beta$, and there is a vector $z\in\mathbb{Z}^n$ satisfying $\|z\|\leq\alpha$ and $Ax=y+z\pmod{q}$.

Note that $x\neq 0$ since $\|y\|>\alpha$.

B then computes $v:=(w, x)$. If $w^t=s^tA+e^t$ for $s\leftarrow\theta^n$, $e\leftarrow\chi^m$, then $v=(s^tA+e^t)x=s^t(y+z)+e^tx\Rightarrow\|v\|\leq\|\theta\|\cdot r+\|\theta^n\|\cdot\alpha+\|\chi^m\|\cdot\beta<q/4.$ Otherwise v distributes uniformly random over $\mathbb{Z}_q$. So B can compare v with the threshold value and wins the decisional LWE challenge with probability ½ plus non-negligible.

Alternatively, we can also prove that the approximate ISIS problem is as hard as the standard ISIS.

Theorem 3.4 ISIS$_{n,n+m,q,\beta}\geq_p$ Approx.ISIS$_{n,m,q,\alpha+\beta,\beta}$; ISIS$_{n,n+m,q,\alpha+\beta}\leq_p$ Approx.ISIS$_{n,m,q,\alpha,\beta}$.

Proof. The reductions go through the HNFs of the ISIS and the approximate ISIS problems. We will show ISIS=HNF.ISIS=HNF.Approx.ISIS=Approx.ISIS under proper settings of parameters.

Recall that ISIS$_{n,m,q,\beta}$=HNF.ISIS$_{n,m,q,\beta}$ as explained in the preliminary. Also, HNF.ISIS$_{n,m,q,\beta}\geq_p$ HNF.Approx.ISIS$_{n,m,q,\alpha,\beta}$ for any $\alpha\geq 0$ by definition. It remains to show the rest of the connections.

Lemma 3.5 HNF.ISIS$_{n,m,q,\alpha+\beta}\leq_p$ HNF.Approx.ISIS$_{n,m,q,\alpha,\beta}$.

Proof. Suppose there is a polynomial time algorithm A that solves HNF.Approx.ISIS$_{n,m,q,\alpha,\beta}$, we build a polynomial time algorithm B that solves HNF.ISIS$_{n,m,q,\alpha+\beta}$. Given an HNF.ISIS instance $[I_n|A]\in\mathbb{Z}_q^{n\times m}$, y, B passes the same instance to A, gets back a vector x such that $[I_n|A]\cdot x=y+z\pmod{q}$.

where $\|x\|\leq\beta$, $\|z\|\leq\alpha$. Now write $x=:[x_1^t|x_2^t]^t$ where $x_1\in\mathbb{Z}^n$, $x_2\in\mathbb{Z}^m$. Then $x':=[(x_1-z)^t|x_2^t]^t$ satisfies $[I_n|A]\cdot x'=y\pmod{q}$, and $\|x'\|\leq\alpha+\beta$. So x' is a valid solution to HNF.ISIS.

Lemma 3.6 HNF.Approx.ISIS$_{n,n+m,q,\alpha,\beta}\leq_p$ Approx.ISIS$_{n,m,q,\alpha,\beta}$.

Proof. Suppose there is a polynomial time algorithm A that solves Approx.ISIS$_{n,m,q,\alpha,\beta}$, we build a polynomial time algorithm B that solves HNF.Approx.ISIS$_{n,n+m,q,\alpha,\beta}$. Given $[I_n|A]\in\mathbb{Z}_q^{n\times(n+m)}$, $y\in\mathbb{Z}_q^n$ as an HNF.Approx.ISIS instance, B passes $A\in\mathbb{Z}_q^{n\times m}$, y to A, gets back a short vector $x\in\mathbb{Z}^m$. Then $[0_n^t|x^t]^t$ is a valid solution to the HNF.Approx.ISIS instance.

Lemma 3.7 HNF.Approx.ISIS$_{n,n+m,q,\alpha,\beta}\geq_p$ Approx.ISIS$_{n,m,q,\alpha+\beta,\beta}$.

Proof. Suppose there is a polynomial time algorithm A that solves HNF.Approx.ISIS$_{n,n+m,q,\alpha,\beta}$, we build a polynomial time algorithm B that solves Approx.ISIS$_{n,m,q,\alpha+\beta,\beta}$. Given an Approx.ISIS instance $A\in\mathbb{Z}_q^{n\times m}$, $y\in\mathbb{Z}^n$, B passes $[I_n|A]\in\mathbb{Z}_q^{n\times(n+m)}$, y as an HNF.Approx.ISIS instance to A, gets back an answer $x\in\mathbb{Z}^{m+n}$ such that $[I_n|A]\cdot x=y+z\pmod{q},$ (1)

where $\|x\|\leq\beta$, $\|z\|\leq\alpha$.

Now write $x=:[x_1^t|x_2^t]^t$ where $x_1\in\mathbb{Z}^n$, $x_2\in\mathbb{Z}^m$. Rewriting Eqn. (1) gives $A\cdot x_2=y+z-x_1\pmod{q},$ so $x_2$ is a valid solution to Approx.ISIS$_{n,m,q,\alpha+\beta,\beta}$.

Theorem 3.4 then follows the lemmas above.

The following statement immediately follows the proof of Lemma 3.7.

Corollary 3.8 An $(\alpha,\beta)$-approximate trapdoor for [I|A] is an $(\alpha+\beta, \beta)$-approximate trapdoor for A.

Lemma 3.9 HNF.Approx.ISIS$_{n,n+m,q,\alpha,\beta}\geq_p$ Approx.ISIS$_{n,m,q,2(\alpha+\beta),\beta}$.

Proof. Suppose there is a polynomial time algorithm A that solves HNF.Approx.ISIS$_{n,n+m,q,\alpha,\beta}$, we build a polynomial time algorithm B that solves Approx.ISIS$_{n,m,q,\alpha+\beta,\beta}$. Given an Approx.ISIS instance $A\in\mathbb{Z}_q^{n\times m}$, $y\in\mathbb{Z}^n$, B first check if $\|y\|\leq\alpha+\beta$. If so, then find $y':=y+\Delta y$ such that $\|y'\|>\alpha+\beta$ and $\|y-y'\|\leq\alpha+\beta$; if not then simply set $y':=y$ and $\Delta y:=0$. B then passes $[I_n|A]\in\mathbb{Z}_q^{n\times(n+m)}$, y' as an HNF.Approx.ISIS instance to A, gets back an answer $x\in\mathbb{Z}^{m+n}$ such that $[I_n|A]\cdot x=y'+z\pmod{q},$ (2)

where $\|x\|\leq\beta$, $\|z\|\leq\alpha$.

Now write $x=:[x_1^t|x_2^t]^t$ where $x_1\in\mathbb{Z}^n$, $x_2\in\mathbb{Z}^m$. Since $\|y'\|>\alpha+\beta$, $x_2$ must be a non-zero short vector. Rewriting Eqn. (2) gives $A\cdot x_2=y+\Delta y+z-x_1\pmod{q},$ so $x_2$ is a valid solution to Approx.ISIS$_{n,m,q,2(\alpha+\beta),\beta}$.

IV. APPROXIMATE GADGET TRAPDOOR

We present an instantiation of an approximate trapdoor based on the gadget-based trapdoor generation and preimage sampling algorithms of [MP12] (without the tag matrices). In short, we show how to generate a pseudorandom A with entries modulo q along with an approximate trapdoor R with small integer entries.

In the rest of this section, we first recall the exact G-trapdoor from [MP12], then present the approximate trapdoor generation algorithm and the approximate preimage sampling algorithm. Finally we analyze the preimage distribution. The analyses make extensive use of Theorem 2.7 (linear transformations of discrete Gaussians).

A. Recall the G-Trapdoor from MP12

Let $b \geq 2$ be the base for the G-lattice. Let q be the modulus, $k = \lceil \log_b q \rceil$. b is typically chosen to be 2 for simplicity, but often a higher base b is used for efficiency trade-offs in lattice-based schemes.

Recall the MP12 gadget-lattice trapdoor technique: the public matrix is $$A = [\bar{A} | G - \bar{A}R]$$

where G is the commonly used gadget matrix, $G := I_n \otimes g_k^t$, $g_k^t := (1, b, \ldots, b^{k-1})$, and R is a secret, trapdoor matrix with small, random entries. A is either statistically close to uniformly random or pseudorandom, depending on the structure of $\bar{A}$ and the choice of $\chi$ (in the pseudorandom case $\chi \subseteq \mathbb{Z}$ Z is chosen to be a distribution such that $LWE_{n,n,q,\chi,U(\mathbb{Z}_q),\chi}$ is hard). In this paper we focus on the pseudorandom case since the resulting public matrix A and preimage have smaller dimensions.

In order to sample a short element in $\Lambda_u^{\perp}(A)$, we use the trapdoor to map short coset representatives of $\Lambda_q^{\perp}(G)$ to short coset representatives of $\Lambda_q^{\perp}(A)$ by the relation $$A \begin{bmatrix} R \\ I \end{bmatrix} = G.$$

Using the trapdoor as a linear transformation alone leaks information about the trapdoor. Therefore, we perturb the sample to statistically hide the trapdoor. Let $\Sigma_p$ be a positive definite matrix defined as $$\Sigma_p := s^2 I - \sigma^2 \begin{bmatrix} RR^t & R^t \\ R & I \end{bmatrix}$$

where $\sigma$ is at least $\eta_\epsilon(\Lambda_q^{\perp}(G))$. The perturbation can be computed offline as $p \leftarrow D_{\mathbb{Z}^m, \sqrt{\Sigma_p}}$. We then sample a G-lattice vector in a coset dependent on p as $z \leftarrow C_{\Lambda_v^{\perp}(G), \sigma}$ and $v = u - Ap \in \mathbb{Z}_q^n$. Finally, the preimage is set to be $$y := p + \begin{bmatrix} R \\ I \end{bmatrix} z.$$

B. The Algorithms of the Approximate G-Trapdoor

As mentioned in the introduction, one objective of obtaining an approximate trapdoor is to adapt the MP12 algorithms with a gadget matrix without the lower-order entries. Let $0 < l < k$ be the number of lower-order entries dropped from the gadget vector $g \in \mathbb{Z}^k$. Define the resulting approximate gadget vector as $f := (b^l, b^{l+1}, \ldots, b^{k-1})^t \in \mathbb{Z}^{(k-l)}$. Let $w = n(k-l)$ be the number of columns of the approximate gadget $F := I_n \otimes f^t \in \mathbb{Z}^{n \times w}$. Then the number of columns of A will be $m := 2n + w$.

FIG. 7 shows algorithms for generating a trapdoor matrix and verification matrix, and sampling values from a Gaussian gadget lattice distribution.

1. Algorithm 1: Sampling from Gadget Distribution

Algorithm 1 shows an algorithm for sampling a vector from a Gaussian distribution based on lattice derived from a gadget matrix. Algorithm 1 takes in a value v from $\mathbb{Z}_q$ (v may be one component of a vector). The gadget sampling algorithm also takes in σ, which defines the width of the distribution. This algorithm may be performed by a sending device, such as sending device 115 of FIG. 1. Additionally, the steps of Algorithm 1 may be performed as part of a signature generation process such as that of FIG. 3.

In step 701, the sending device can sample a vector x comprising k values from $\mathbb{Z}$. The values may be pulled from a distribution D. D may be a lattice Gaussian distribution, that is, a Gaussian distribution over a lattice, and the lattice may be defined by a gadget matrix, and the deviation σ. The distribution D is described in further detail in Section II.C.

In step 702, the sending device can drop the first l entries from the vector x and take the last k-l entries of the vector x as an intermediate vector z.

In step 703, the sampling algorithm can return the intermediate vector z.

2. Algorithm 2: Generating Trapdoor Matrix

Algorithm 2 shows a trapdoor matrix generation algorithm. As input, this algorithm takes in a security parameter λ. Trapdoor generation can be done by a generating device, such as generating device 105 of FIG. 1. Additionally, the steps of Algorithm 2 may be performed as part of a key generation process such as that of FIG. 2.

Prior to generating the trapdoor matrix, the generating device can generate a gadget matrix G. The gadget matrix G may be a matrix where each column comprises one value of an ascending power of a base b (e.g., b=2), fork powers ($k = \lceil \log_b q \rceil$). There may be n repeats of the k columns with ascending powers of b, resulting in an n×k matrix. The generating device can then generate a reduced gadget matrix F that has dimension n×w (where w=n(k-l)), after dropping the first l columns (the columns with the smallest powers) of each group of k columns of the gadget matrix G. More detail about gadget matrices and the generation of a reduced gadget matrix can be found in section II.D.

In step 711, the generating device can randomly sample an n×n uniform matrix $\hat{A}$ from a uniform distribution over $\mathbb{Z}_q$ for a modulus q.

In step 712, the generating device can form a generation matrix $\bar{A}$. The generation matrix $\bar{A}$ can be a n×2n matrix formed from concatenating the uniform matrix $\hat{A}$ and an n×n identity matrix $I_n$. Thus $\bar{A} := [I_n, \hat{A}]$.

In step 713, an approximate trapdoor R can be sampled from a distribution χ. The approximate trapdoor R can be a 2n×w matrix. The distribution x may be the distribution $D_{\mathbb{Z},\sigma}$, the Gaussian distribution over integers with width σ.

In step 714, the generating device can form the verification matrix A. The verification matrix A can be $A:=[\bar{A}|F-\bar{A}R]$. The verification matrix may have dimension n×m, where m=2n+w=2n+n(k-1), with elements from $\mathbb{Z}_q$.

3. Algorithm 3: Generating Lattice-Based Signature

Algorithm 3 shows a signature generation algorithm. The signature generation algorithm takes as input the verification matrix A, the trapdoor matrix R, a message vector u, and a distribution width s. The distribution width s may be related to the distribution width a through the equation in table 1. Signature generation may be done by a sending device, such as sending device 115 of FIG. 1. Additionally, the steps of Algorithm 3 may be performed as part of a signature generation process such as that of FIG. 3.

In step 721, the generating device samples a perturbation vector p from a Gaussian distribution. The perturbation vector p has length m. The covariance of the perturbation is chosen to hide the trapdoor as in the exact gadget-based trapdoor, i.e.

$$\Sigma_p := s^2 I_m - \sigma^2 \begin{bmatrix} RR^t & R \\ R^t & I \end{bmatrix}.$$

In step 722, the generating device can form a lattice vector v from the message u, the verification matrix A, and the perturbation vector p. The lattice vector v has length n and is formed as v=u−Ap.

In step 723, the generating device can sample an approximate gadget preimage vector z (i.e., the intermediate vector), using the gadget sampling algorithm of Algorithm 1. The gadget sampling algorithm can sample a vector z for each element of the lattice vector v and concatenate them together, thus there are n(k−1) total elements in the total preimage vector z.

In step 724, the generating device can form the signature vector y, which is a vector of length m=2n+w=2n+n(k−1). The perturbation p can be added to a product of the trapdoor matrix R and the preimage vector z. The trapdoor matrix is R has dimension 2n×w, and thus it can be stacked on a w×w identity matrix, in order to have the appropriate dimension of a 2n+w×w matrix. This stack is multiplied by the preimage vector z which has length w, so the product is a vector of length 2n+w=m.

In step 725, the signature generation algorithm can return the signature vector y.

The results of this section are summarized in the following theorem.

Theorem 4.1 There exists probabilistic, polynomial time algorithms Approx.TrapGen(•) and Approx.Sample Pre(•,•,•,•) satisfying the following.

1. Approx.TrapGen(n) takes an input a security parameter n and returns a matrix-approximate trapdoor pair (A, R)∈$\mathbb{Z}_q^{n \times m} \times \mathbb{Z}^{2n \times n(k-1)}$.
2. Let A be generated with an approximate trapdoor as above, approx. $A^{-1}(\bullet)$ denote the approximate preimage sampling algorithm, Approx.SamplePre (A, R, s, •). The following two distributions are statistically indistinguishable:

$$\{(A, y, u, e): u \leftarrow U(\mathbb{Z}_q^n),\ y \leftarrow \text{approx. } A^{-1}(u),\ e = u - Ay \bmod q\}$$

and $$\{(A, y, Ay + e\bmod q, e\bmod q): y \leftarrow D_{\mathbb{Z},s}^m,\ e \leftarrow D_{\mathbb{Z}^n,\sigma} \sqrt{(b^{2l}-1)/(b^2-1)}\}$$

for any $\sigma \geq \sqrt{b^2+1}\omega(\sqrt{\log n})$ and $s \geq \sqrt{\sigma^2 s_1^2(R) + \omega\sqrt{\log n}}$. Furthermore, in the second distribution, A is computationally indistinguishable from random assuming $LWE_{n,n,q,\chi,U(\mathbb{Z}_q),\chi}$.

Let us remark that while the preimage sampling algorithm works for any target $u \in \mathbb{Z}_q^n$, we are able to prove the approximate preimage sample-coset pair (y, u) hides the approximate trapdoor, R, over a uniform target $u \in \mathbb{Z}_q^n$. This is unlike the exact gadget-based trapdoor setting in [MP12] which proves the trapdoor is hidden for each fixed u. In the overview of the proof idea, we will explain where the proof breaks down when we try to spell out the preimage distributions of every $u \in \mathbb{Z}_q^n$.

C. Analyze the Preimage and Error Distributions for a Uniformly Random Target This subsection is dedicated to proving Theorem 4.1.

Let $x \in \mathbb{Z}^{nk}$ denote the short preimage of u−Ap(mod q) under the full gadget matrix G, i.e. Gx=u−Ap(mod q). The main idea of the proof is to first show that the joint distribution of (p, x) produced in Algorithm 4 is statistically close to $$D_{\Lambda_u^\perp[A G],\sqrt{\Sigma_p \oplus \sigma^2}}$$

for any $u \in \mathbb{Z}_q^n$ (this is a stronger theorem than what we need). And then apply the linear transformation theorem on (p, x) to obtain the distributions of y and e. However, applying the linear transformation theorem directly on the lattice coset $\Lambda_u^{-1}[A, G]$ leads to a technical problem. That is, the intermediate lattice intersections $\Lambda_T$ required in Theorem 2.7 have large smoothing parameters. To get around this problem, we use the condition that u is uniformly random to argue that (p, x) is statistically close to $$D_{\mathbb{Z}^{m+nk},\sqrt{\Sigma_p \oplus \sigma^2}}.$$

Then the support of (p, x) is $\mathbb{Z}^{m+nk}$, so we can apply the linear transformation theorem to prove the final distributions of y and e are trapdoor-independent.

Formally, let ε=negl(λ)>0. We first prove three lemmas.

Lemma 4.2 For any $\sigma \geq \eta_\varepsilon(\Lambda^\perp G)$, the random process of first choosing $u \leftarrow U(\mathbb{Z}_q^n)$ then returning $x \leftarrow D_{\Lambda_u^\perp(G),\sigma}$ is statistically close to sampling $x \leftarrow D_{\mathbb{Z}^{nk},\sigma}$.

Proof. The proof follows directly from $\det(\Lambda_q^\perp(G))=q^n$ and Corollary 2.7. Alternatively, one can use two applications of the fact $\rho_r(\Gamma+c) \in (1\pm\varepsilon)\varrho^n/\det(\Gamma)$ for any $r \geq \eta_\varepsilon(\Gamma)$. The latter yields $$Pr\{\text{Process returns } x\} \in \left(\frac{1-\varepsilon}{1+\varepsilon}, \frac{1+\varepsilon}{1-\varepsilon}\right) \cdot D_{\mathbb{Z}^{nk}_{\sigma}}(x).$$

Lemma 4.3 The following random processes are statistically close for any $\sigma \geq \sqrt{b^2+1}\omega(\sqrt{\log n}) \geq \eta_\varepsilon(g^t)$: sample a uniformly random coset $u \leftarrow U(\mathbb{Z}_q)$, then return the error $e := u -$ Gsamp.Cut$(u, \sigma)$ mod $q$. Or, return $$e \leftarrow D_{\mathbb{Z},\sigma \sqrt{(b^{2l}-1)/(b^2-1)}} \bmod q.$$

Proof. For a fixed $u \in \mathbb{Z}_q$, the error is distributed as $$e := L \cdot D_{\Lambda_u^\perp(g^t),\sigma} := (1,b,b^2,\ldots,b^{l-1},0) \cdot D_{\Lambda_u^\perp(g^t),\sigma}.$$

Randomizing over $u$ gives us $e \sim_\varepsilon L \cdot D_{\mathbb{Z}^k,\sigma}$ by Lemma 4.2. Next, we apply Theorem 2.7. Let $B_q=[b_1, \ldots, b_k]$ be the basis of $\Lambda_q^\perp(g^t)$ given in Section 2. Then, the kernel of $L$ is generated by $\{b_1, \ldots, b_{i-1}, e_i, \ldots, e_{k-1}\}$ (recall that $\{e_i\}_{i=1}^n$ denotes the canonical basis $\mathbb{R}^n$) and $\Lambda_L := \text{Ker}(L) \cap \mathbb{Z}^k$ is the set of all integer combinations of these vectors. $\Lambda_L$ spans the kernel of $L$ and the smoothing parameter of $\Lambda_L$ is at most $\sqrt{b^2+1}\omega(\sqrt{\log n})$ since $\|b_i\| \leq \sqrt{b^2+1}$ for all $i=1, \ldots, l-1$.

Let $$R' := \begin{bmatrix} R \\ I_{n(k-l)} \end{bmatrix}.$$

Next, we analyze the distribution given by the linear transformation representing truncating $x \in \mathbb{Z}^{nk}$ in the joint distribution of $$(p, x) \leftarrow D_{\mathbb{Z}^{m+nk}, \sqrt{\Sigma_p \oplus \sigma^2 I_{nk}}}$$

to $z \in \mathbb{Z}^{n(k-l)}$ (as in GSAMP.CUT, Algorithm 1) and returning $y := p + R'z$. For simplicity, we permute the columns of $G$ to $G' := [F | I_n \otimes (1, b, \ldots, b^{l-1})]$. This allows us to express truncation and convolution as a simple linear transformation: $y = L(p, x)$ for $L := [I_m | R' | 0]$.

Lemma 4.4 For any $\sqrt{\Sigma_p}$, $$\sigma \geq \eta_\varepsilon(\mathbb{Z}^{nk}), LD_{\mathbb{Z}^{m+nk}, \sqrt{\Sigma_p \oplus \sigma^2 I_{nk}}}$$

is statistically close to $D_{\mathbb{Z}^m,s}$.

Proof. The range and covariance are immediate. Next, we use Theorem 2.7. The kernel of $L$ is given by all vectors $(a, b, c)$ where $(b, c) \in \mathbb{R}^{nk}$ and $a = R'b$. The integer lattice $\mathbb{Z}^{n+nk}$ contains all such integer vectors so $\Lambda_L := \mathbb{Z}^{m+nk} \cap \text{ker}(L)$ spans $L$'s kernel.

Now we determine the smoothing parameter of $\Lambda_L$. Add $nl$ zero columns to $R'$ to form $R_{nk} := [R'|0]$ and rotate the space by $$Q := \begin{bmatrix} I & R_{nk} \\ 0 & I_{nk} \end{bmatrix}.$$

This rotation yields $Q\Lambda_L = \{0\} \otimes \mathbb{Z}^{nk}$ and since rotating a covariance does not change its eigenvalues, we have $\sqrt{\Sigma_p \otimes \sigma^2 I_{nk}} \geq \eta_\varepsilon(\mathbb{Z}^{nk})$. This implies $$LD_{\mathbb{Z}^{m+nk}, \sqrt{\Sigma_p \oplus \sigma^2 I_{nk}}}$$

is statistically close to $D_{\mathbb{Z}^m,s}$.

We are now ready to prove Theorem 4.1.

Proof (of Theorem 5.1) We prove Theorem 5.1 via a sequence of hybrid distributions. Let $M := [I_n \otimes (1, b, \ldots, b^{l-1}, 0, \ldots, 0)] \in \mathbb{Z}^{n \times (nk)}$ be the linear transformation corresponding to obtaining the error vector $e \in \mathbb{Z}^n$ from $x \in \mathbb{Z}^{nk}$. Let $L$ be the linear transformation used in Lemma 4.4.

Note that the equation $u = v + Ap = Gx + Ap = Fz + e + Ap = AL(p, x) + e = Ay + e \pmod{q}$ holds in all the hybrids. The difference lies in the order and the distributions that these vectors are sampled from. In all the hybrids except the last one, $A$ is generated as $A := [\bar{A} | F - \bar{A}R]$ for $\bar{A} := [I_n, A_0] \in \mathbb{Z}_q^{n \times 2n}$.

Real distribution: The real distribution of $\{(A, y, u, e)\}$ is: $A, u \leftarrow U(\mathbb{Z}_q^n)$, $$p \leftarrow D_{\mathbb{Z}^m, \sqrt{\Sigma_p}},$$

$v := u - Ap, x \leftarrow D_{\Lambda_v^\perp(G),\sigma}, e = M(x)$, and $y = L(p,x)$.

Hybrid 1: Here we swap the order of sampling $u$ and $v$ by first sampling $v\ U(\mathbb{Z}_q^n)$ and setting $u := v + Ap$: $A, v \leftarrow U(\mathbb{Z}_q^n)$, $$p \leftarrow D_{\mathbb{Z}^m, \sqrt{\Sigma_p}},$$

$u = v + Ap$. We keep $x$, $e$, and $y$ unchanged: $x \leftarrow D_{\Lambda_v^\perp(G),\sigma}$, $e = M(x)$, and $y = L(p, x)$. Then, the real distribution and Hybrid 1 are the same.

Hybrid 2: Instead of sampling a uniform $v \in \mathbb{Z}_q^n$ and a G-lattice sample $x \leftarrow D_{\Lambda_v^\perp(G),\sigma}$, we sample $x \leftarrow D_{\mathbb{Z}^{nk},\sigma}$ and $v = Gx \in \mathbb{Z}_q^n$ The rest remains the same:

$$A, x \leftarrow D_{\mathbb{Z}^{nk},\sigma}, v = Gx, p \leftarrow D_{\mathbb{Z}^m, \sqrt{\Sigma_p}},$$
$$u = v + Ap, e = M(x), \text{ and } y = L(p, x).$$

Lemma 4.2 implies Hybrid 1 and Hybrid 2 are statistically close.

Hybrid 3: We combine $p$, $x$ into the joint distribution $$(p, x) \leftarrow D_{\mathbb{Z}^{m+nk}, \sqrt{\Sigma_p \oplus \sigma^2 I}}:$$

$$A, (p, x) \leftarrow D_{\mathbb{Z}^{m+nk}, \sqrt{\Sigma_p \oplus \sigma^2 I}}, e = M(x),$$
$$y = L(p, x), v = Gx, \text{ and } u = v + Ap.$$

Hybrid 4: Here we apply the linear transformation theorem on e, y:

$$A, (p, x) \leftarrow D_{\mathbb{Z}^{m+nk}, \sqrt{\Sigma_p \oplus \sigma^2 I}}, e \leftarrow D_{\mathbb{Z}^n, \sigma\sqrt{(b^{2l}-1)/(b^2-1)}},$$

$$y = D_{\mathbb{Z}^m, s}, v = Gx, \text{ and } u = v + Ap.$$

Lemmas 4.3 and 4.4 imply Hybrids 3 and 4 are statistically close.

Final distribution: Sample $A \leftarrow U(\mathbb{Z}_q^{n \times m})$ and keep the rest of the vectors from the same distribution as Hybrid 4 (notice that the trapdoor R of A are not used to sample p, x, e and y). The final distribution is computationally indistinguishable from Hybrid 4 assuming $$LWE_{n,n,q,\chi,U(\mathbb{Z}_q),\chi}.$$

D. From an Approximate G-Trapdoor to an Approximate Kernel-Trapdoor

Given an approximate G-trapdoor for $A \in \mathbb{Z}_q^{n \times m}$ in the form of $R \in \mathbb{Z}^{(m-w) \times w}$ where $w = n(k-l)$ and $$A \cdot \begin{pmatrix} R \\ I_w \end{pmatrix} = F (mod\, q).$$

We transform it to an approximate kernel of m columns (i.e., smaller than n+m) that still preserves the trapdoor functionality.

The transformation is similar to the one from [MP12] that works over the exact trapdoors. Write $A = [A_1 | A_2]$ where $A_1 \in \mathbb{Z}_q^{n \times (m-w)}$. Let $W \in \mathbb{Z}^{w \times (m-w)}$ be an approximate short pre-image of $A_1$ under the public matrix F, i.e. $F \cdot W = A_1 + E_1 (mod\, q)$. Let $S \in \mathbb{Z}^{w \times w}$ be an approximated kernel of F, i.e. $F \cdot S = E_2 (mod\, q)$ (both the norms of $E_1$ and $E_2$ are small). Then $$(A_1 | A_2) \cdot \begin{pmatrix} I & R \\ & I \end{pmatrix} \underbrace{\cdot \begin{pmatrix} I \\ W & S \end{pmatrix}}_{=:K} = (A_1|F) \begin{pmatrix} I \\ W & S \end{pmatrix} = (E_1 | E_2)(mod\, q)$$

So K is an approximate kernel of A of m columns (i.e. lower than n+m) that is at the same time an approximate trapdoor.

V. HASH-AND-SIGN SIGNATURE INSTANTIATED WITH THE APPROXIMATE TRAPDOOR

We spell out the details of the hash-and-sign signature scheme from [GPV08] instantiated with the approximate G-trapdoor instead of an exact trapdoor.

Recall the parameters from the last section. We set $k = \lceil \log_b q \rceil$, set l to be the number of entries dropped from the G-trapdoor such that $1 \leq l < k$ and $m = n(2+(k-l))$. Let $\sigma, s \in \mathbb{R}^+$ be the discrete Gaussian widths of the distributions over the cosets of $\Lambda_q^\perp(G)$ and $\Lambda_q^\perp(A)$ respectively. Let $\chi$ be the distribution of the entries of the trapdoor R chosen so that $LWE_{n,n,q,\chi,U(\mathbb{Z}_q),\chi}$ is hard.

Construction 5.1 Given an approximate trapdoor sampler from Theorem 4.1, a hash function $H = \{H_A : \{0,1\}^* \to R_\lambda\}$ modeled as a random oracle, we build a signature scheme as follows.

Gen($1^\lambda$): The key-generation algorithm can sample $A \in \mathbb{Z}_q^{n \times m}$ together with its ($\alpha$, $\beta$)-approximate trapdoor R from Approx.TrapGen($1^\lambda$). Let the range $R_\lambda$ of H be $\mathbb{Z}_q^\perp$. It can output A as the verification matrix and can keep R as the trapdoor matrix (i.e., the secret signing key).

Sig(R, m): The signing algorithm can check if the message-signature pair (m, $x_m$) has been produced before. If so, it outputs $x_m$ as the signature of m; if not, it computes $u = H(m)$, and samples an approximate pre-image $x_m \leftarrow$ Approx.SamplePre(A, R, u, s). It outputs $x_m$ as the signature and stores (m, $x_m$) in the list.

Ver(A, m, x): The verification algorithm checks if $\|x\| \beta$ and $\|A \cdot x - H(m)\| \leq \alpha$. If so, it outputs accept; otherwise, it outputs reject.

We provide a proof-of-concept implementation of the signature. Embodiments can use several groups of parameters using different dimensions n, moduli q, bases b, targeting different security level (mainly around 100-bit and 192-bit security). In each group of parameters, we use fixed n, q, b, and compare the use of exact trapdoor (under our reference implementation) versus approximate trapdoor. In FIG. 8 and FIG. 9, 6 groups of parameters are listed.

Let us first explain how we make the security estimations. The concrete security estimation of lattice-based cryptographic primitive is a highly active research area and more sophisticated methods are proposed recently. Here we use relatively simple methods to estimate the pseudorandomness of the public-key (henceforth "LWE security"), and the hardness of breaking approximate ISIS (henceforth "AISIS security"). Let us remark that our estimations may not reflect the state-of-art, but at least provide a fair comparison of the parameters for the exact trapdoor versus the approximate trapdoor.

LWE security depends on the choices of q, n, and the Gaussian width r of the trapdoor R. The estimation of LWE security was done with the online LWE bit security estimator with BKZ as the reduction model 1 [ACD+18].

For the approximate ISIS problem, the only direct cryptanalysis result we are aware of is the work of Bai et al. [BGLS19], but it is not clearly applicable to the parameters we are interested. Instead we estimate AISIS through following the reduction in Lemma 3.5, where $\alpha$ and $\beta$ are the upper-bounds of $l_2$ norm of the error z and preimage x. We estimate the security level of $ISIS_{n,m,q,\alpha+\beta}$ based on how many operations BKZ would take to find a vector in the lattice $$\Lambda\frac{1}{q}(A)$$

of length $\alpha+\beta$. Further, we can throw away columns in A. We choose to only use 2n columns of A as done in [BFRS18], denoted $A_{2n}$, since Minkowski's theorem tells us $$\Lambda\frac{1}{q}(A_{2n})$$

has a shot enough vector. Following [APS15, ACD+18], we use sieving as the SVP oracle with time complexity $2^{0.292k+16.4}$ in the block size, k. BKZ is expected to return a vector of length $\delta^{2n}\det^{1/2n}$ for a lattice of dimension 2n. Hence, we found the smallest block size k achieving the needed $\delta$ corresponding to forging a signature, $$\frac{\alpha+\beta}{\sqrt{q}} = \delta^{2n}.$$

Finally, we used me heuristic $$\delta \approx \left(\frac{k}{2\pi e}(\pi k)^{1/k}\right)^{1/2(k-1)}$$

to determine the relation between k and $\delta$, and we set the total time complexity of BKZ with block-size k, dimension 2n as $$\frac{(2n)^3}{k^2} \cdot \log(2n) \cdot (SVP) = \frac{(2n)^3}{k^2} \cdot \log(2n) \cdot 2^{.292k+16.4} [Che13, APS15].$$

For an estimation of 100-bit security, our reference implementation for the exact trapdoor under the modulus $q \approx 2^{24}$ and base b=2 matches the parameters reported in [BB13] (the parameters in the other implementation [BFRS18, GPR+18] are possibly measured in different ways). We also use smaller moduli and bigger bases to reduce the size and increase the security level. The parameters in FIG. 8 and FIG. 9 suggest that for all the choices of q and b, using the approximate gadget trapdoor by setting $l = \lceil \log_b q \rceil/2 \rceil$ saves about half of the sizes in the public key and signatures comparing to using the exact trapdoor, with even a slight increase in the security estimation.

Our implementation shows that the sizes of the public-key & signature can be reduced to 5 kB & 4.45 kB for an estimation of 100-bit security, and 11.25 kB & 9.38 kB for an estimation of 192-bit security. Those are still larger than, but much closer to the sizes for the signatures based on the rejection sampling approach [Lyu12, BG14, DKL+18, ABB+19]. As a reference, the sizes of the public-key & signature for qTESLA [ABB+19] are 4.03 kB & 3.05 kB for an estimation of 128-bit security, and 8.03 kB & 6.03 kB for an estimation of 192-bit security.

In the security analysis we use the following properties on the distributions produced by Approx.SamplePre proven in Theorem 4.1:
1. An approximate preimage of a uniformly random image is statistically close to a distribution $D_{pre}$, which is independent of A and R.
2. For a uniformly random image, the error vector $e:=u-Ay \pmod q$ is statistically close to a distribution $D_{err}$, which is also independent of A and R.

To prove that the signature satisfies the strong EU-CMA security, we can make use of an additional "near-collision-resistance" property for Ajtai's function, which can be based on the standard SIS assumption. Let us remark that without this property, we can still prove the signature scheme satisfies static security based on the hardness of the approximate ISIS problem.

Lemma 5.2 (The near-collision-resistance of Ajtai's function) For any n, m, $q \in \mathbb{N}$ and $\alpha, \beta \in \mathbb{R}$. If there is an efficient adversary A that given $A \leftarrow U(\mathbb{Z}_q^{n \times m})$, finds $x_1 \neq x_2 \in \mathbb{Z}^m$ such that $\|x_1\| \leq \beta$ and $\|x_2\| \leq \beta$ and $\|Ax_1 - Ax_2 \pmod q\| \leq 2\alpha$ Then there is an efficient adversary B that solves $$SIS_{n,n+m,q,2\sqrt{\alpha^2+\beta^2}}.$$

Proof. Suppose B gets an $$HNF.SIS_{n,n+m,q,2\sqrt{\alpha^2+\beta^2}}$$

(which is as hard as $$SIS_{n,n+m,q,2\sqrt{\alpha^2+\beta^2}})$$

with the public matrix $[I_n|A]$, B sends A to A, gets back $x_1 \neq x_2 \in \mathbb{Z}^m$ such that $\|x_1\| \leq \beta$ and $\|x_2\| \leq \beta$ and $\|y:=Ax_1-Ax_2 \pmod q\| \leq 2\alpha$ B then sets $z := [-y^t | (x_1 - x_2)^t]^t$ as the solution. z is then non-zero and satisfies $\|z\| \leq 2\sqrt{\alpha^2+\beta^2}$ and $[I_n|A]z = 0 \pmod q$.

Theorem 5.3 Construction 6.1 is strongly existentially unforgeable under a chosen-message attack in the random oracle model assuming the hardness of $$SIS_{n,n+m,q,2\sqrt{\alpha^2+\beta^2}}$$

and $LWE_{n,n,q,\chi,U(\mathbb{Z}_q),\chi}$.

Proof. The correctness follows the functionality of the approximate trapdoor.

Suppose there is a polynomial time adversary A that breaks the strong EU-CMA of the signature scheme, we construct a polynomial time adversary B that breaks the near-collision-resistance of Ajtai's function, which is as hard as $$SIS_{n,n+m,q,2\sqrt{\alpha^2+\beta^2}}$$

due to Lemma 5.2.

To start, B sends Ajtai's function A to A as the public key for the signature scheme. Once A makes a random oracle query w.r.t. a message m, B samples $y \leftarrow D_{pre}$, computes $u := Ay + D_{err} \pmod q$ as the random oracle response on m. B then replies u to A and stores (m, u) in the random oracle storage, (m, y) in the message-signature pair storage. Once A makes a signing query on the message m (w log assume m has been queried to the random oracle before, since if not B can query it now), B finds (m, y) in the storage and reply y as the signature. The signatures and the hash outputs produced by B are indistinguishable from the real ones due to the properties of the distributions $D_{pre}$ and $D_{err}$, and the assumption that a real public key is indistinguishable from random under $LWE_{n,n,q,\chi,U(\mathbb{Z}_q),\chi}$ Without loss of generality, assume that before A tries to forge a signature on m*, A has queried H on m*. Denote the pair that B prepares and stores in the random oracle storage as (m*, u*), and the pair in the signature storage as (m*, y*). Finally A outputs y as the forged signature on m*. So we have $\|A(y-y^*)(\bmod q)\| \le 2\alpha$. It remains to prove that $y \ne y^*$ so as to use them as a near-collision-pair. If m* has been queried to the signing oracle before, then $y \ne y^*$ by the definition of a success forgery; if m* has not been queried to the signing oracle before, then y* is with high min-entropy by the settings of the parameter, so $y \ne y^*$ with overwhelming probability.

VI. COMPUTER SYSTEM

Figure 10:
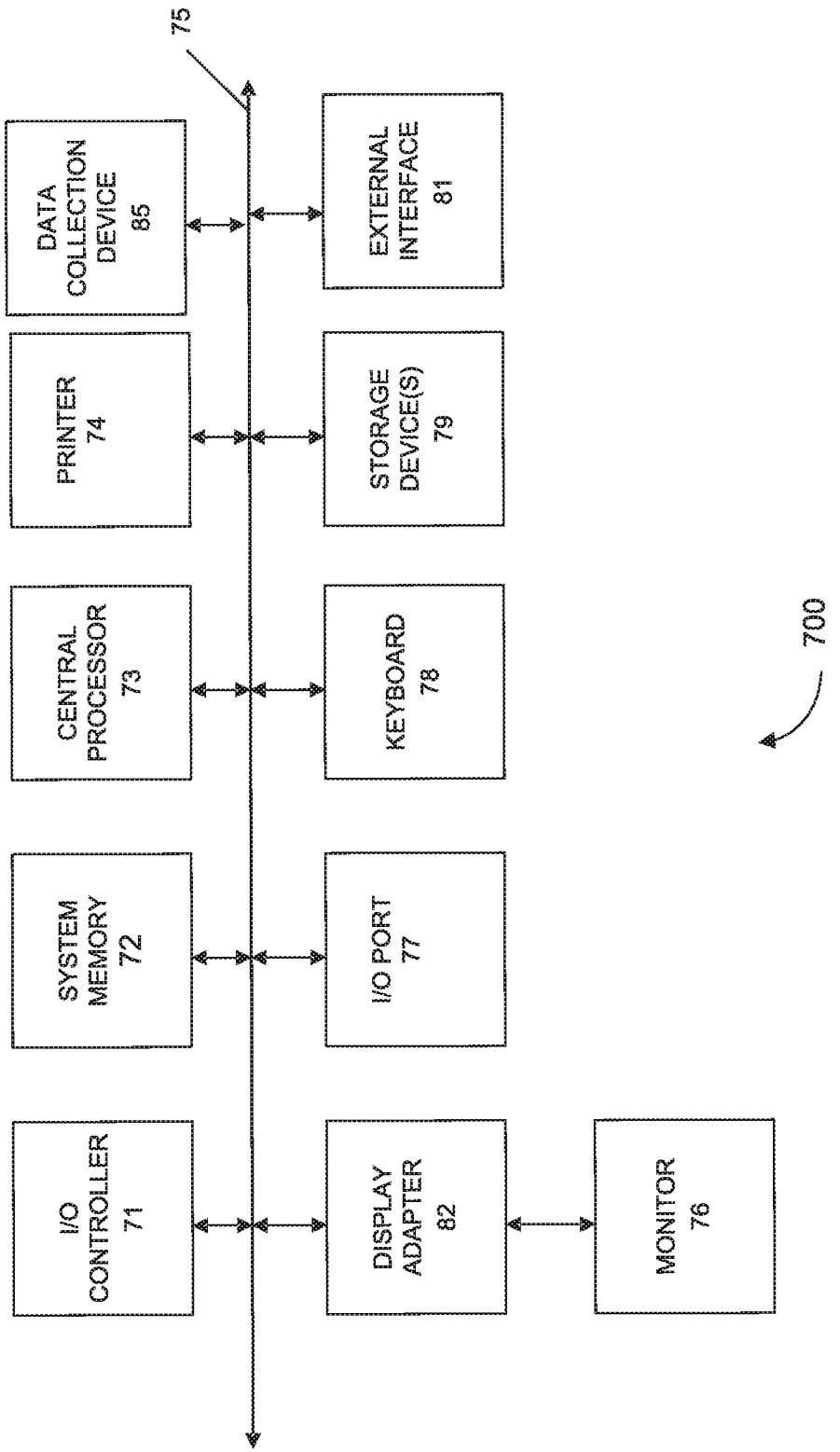
FIG. 10 shows a block diagram of an example computer system usable with systems and methods according to some embodiments.

Any of the computer systems mentioned herein may utilize any suitable number of subsystems. Examples of such subsystems are shown in FIG. 10 in computer apparatus 700. In some embodiments, a computer system includes a single computer apparatus, where the subsystems can be components of the computer apparatus. In other embodiments, a computer system can include multiple computer apparatuses, each being a subsystem, with internal components. A computer system can include desktop and laptop computers, tablets, mobile phones and other mobile devices.

The subsystems shown in FIG. 10 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of a plurality of instructions from system memory 72 or the storage device(s) 79 (e.g., a fixed disk, such as a hard drive, or optical disk), as well as the exchange of information between subsystems. The system memory 72 and/or the storage device(s) 79 may embody a computer readable medium. Another subsystem is a data collection device 85, such as a camera, microphone, accelerometer, and the like. Any of the data mentioned herein can be output from one component to another component and can be output to the user.

A computer system can include a plurality of the same components or subsystems, e.g., connected together by external interface 81, by an internal interface, or via removable storage devices that can be connected and removed from one component to another component. In some embodiments, computer systems, subsystem, or apparatuses can communicate over a network. In such instances, one computer can be considered a client and another computer a server, where each can be part of a same computer system. A client and a server can each include multiple systems, subsystems, or components.

Aspects of embodiments can be implemented in the form of control logic using hardware circuitry (e.g. an application specific integrated circuit or field programmable gate array) and/or using computer software with a generally programmable processor in a modular or integrated manner. As used herein, a processor can include a single-core processor, multi-core processor on a same integrated chip, or multiple processing units on a single circuit board or networked, as well as dedicated hardware. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive, or an optical medium such as a CD (compact disk) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective step or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

VII. REFERENCES

[Ajt96] Miklos Ajtai. Generating hard instances of lattice problems (extended abstract). In *STOC*, pages 99-108, 1996.

[Ajt99] Miklós Ajtai. Generating hard instances of the short basis problem. In Jir Wiedermann, Peter van Emde Boas, and Mogens Nielsen, editors, *Automata, Languages and Programming, 26th International Colloquium, ICALP '99*, Prague, Czech Republic, Jul. 11-15, 1999, *Proceedings*, volume 1644 of LNCS, pages 1-9. Springer, 1999.

[AAAS+19] Gorjan Alagic, Gorjan Alagic, Jacob Alperin-Sheriff, Daniel Apon, David Cooper, Quynh Dang, Yi-Kai Liu, Carl Miller, Dustin Moody, Rene Peralta, et al. *Status Report on the First Round of the NIST Post-Quantum Cryptography Standardization Process*. US Department of Commerce, National Institute of Standards and Technology, 2019.

[APS15] Martin R. Albrecht, Rachel Player, and Sam Scott. On the concrete hardness of learning with errors. *J. Mathematical Cryptology*, 9(3):169-203, 2015.

[ACD+18] Martin R. Albrecht, Benjamin R. Curtis, Amit Deo, Alex Davidson, Rachel Player, Eamonn W. Postlethwaite, Fernando Virdia, and Thomas Wunderer. Estimate all the {LWE, NTRU} schemes! In *Security and Cryptography for Networks—11th International Conference, SCN 2018*, Amalfi, Italy, Sep. 5-7, 2018, *Proceedings*, pages 351-367, 2018.

[ABB+19] Erdem Alkim, Paulo S. L. M. Barreto, Nina Bindel, Patrick Longa, and Jefferson E. Ricardini. The lattice-based digital signature scheme qtesla. *IACR Cryptology ePrint Archive*, 2019:85, 2019.

[AP11] Joel Alwen and Chris Peikert. Generating shorter bases for hard random lattices. *Theory of Computing Systems*, 48(3):535-553, 2011.

[ACPS09] Benny Applebaum, David Cash, Chris Peikert, and Amit Sahai. Fast cryptographic primitives and circular-secure encryption based on hard learning problems. In Shai Halevi, editor, *Advances in Cryptology—CRYPTO 2009, 29th Annual International Cryptology Conference*, Santa Barbara, Calif., USA, Aug. 16-20, 2009. *Proceedings*, volume 5677 of LNCS, pages 595-618. Springer, 2009.

[BGLS19] Shi Bai, Steven D. Galbraith, Liangze Li, and Daniel Sheffield. Improved combinatorial algorithms for the inhomogeneous short integer solution problem. *J. Cryptology*, 32(1):35-83, 2019.

[BB13] Rachid El Bansarkhani and Johannes A. Buchmann. Improvement and efficient implementation of a lattice-based signature scheme. In *Selected Areas in Cryptography*, volume 8282 of *Lecture Notes in Computer Science*, pages 48-67. Springer, 2013.

[BFRS18] Pauline Bert, Pierre-Alain Fouque, Adeline Roux-Langlois, and Mohamed Sabt. Practical implementation of ring-sis/lwe based signature and IBE. In *PQCrypto*, volume 10786 of *Lecture Notes in Computer Science*, pages 271-291. Springer, 2018.

[CC17] Ran Canetti and Yilei Chen. Constraint-hiding constrained prfs for nc$^1$ from LWE. In *EUROCRYPT (1)*, volume 10210 of *Lecture Notes in Computer Science*, pages 446-476, 2017.

[Che13] Yuanmi Chen. R'eduction de r'eseau et s'ecurit'e concrete du chiffrement compl'etement homomorphe. PhD thesis, Paris 7, 2013.

[dPLS18] Rafael del Pino, Vadim Lyubashevsky, and Gregor Seiler. Lattice-based group signatures and zero-knowledge proofs of automorphism stability. In *Proceedings of the 2018 ACM SIGSAC Conference on Computer and Communications Security, CCS 2018*, Toronto, ON, Canada, Oct. 15-19, 2018, pages 574-591, 2018.

[DKL+18] L'eo Ducas, Eike Kiltz, Tarte ede Lepoint, Vadim Lyubashevsky, Peter Schwabe, Gregor Seiler, and Damien Stehl'e. Crystals-dilithium: Alattice-based digital signature scheme. *IACR Trans. Cryptogr. Hardw. Embed. Syst.*, 2018(1):238-268, 2018.

[FHK+18] Pierre-Alain Fouque, Jeffrey Hoffstein, Paul Kirchner, Vadim Lyubashevsky, Thomas Pornin, Thomas Prest, Thomas Ricosset, Gregor Seiler, William Whyte, and Zhenfei Zhang. Falcon: Fast-fourier lattice-based compact signatures over ntru, 2018.

[Gen09] Craig Gentry. Fully homomorphic encryption using ideal lattices. In *STOC*, pages 169-178, 2009.

[GGH97] Oded Goldreich, Shafi Goldwasser, and Shai Halevi. Public-key cryptosystems from lattice reduction problems. In *Advances in Cryptology—CRYPTO '97, 17th Annual International Cryptology Conference*, Santa Barbara, Calif., USA, Aug. 17-21, 1997, *Proceedings*, pages 112-131, 1997.

[GGH15] Craig Gentry, Sergey Gorbunov, and Shai Halevi. Graph-induced multilinear maps from lattices. In *Theory of Cryptography—12th Theory of Cryptography Conference, TCC 2015*, Warsaw, Poland, Mar. 23-25, 2015, *Proceedings, Part II*, pages 498-527, 2015.

[GKW17] Rishab Goyal, Venkata Koppula, and Brent Waters. Lockable obfuscation. In *FOCS*, pages 612-621. IEEE Computer Society, 2017.

[GPV08] Craig Gentry, Chris Peikert, and Vinod Vaikuntanathan. Trapdoors for hard lattices and new cryptographic constructions. In *STOC*, pages 197-206, 2008.

[GS02] Craig Gentry and Mike Szydlo. Cryptanalysis of the revised ntru signature scheme. In *International Conference on the Theory and Applications of Cryptographic Techniques*, pages 299-320. Springer, 2002.

[GVW13] Sergey Gorbunov, Vinod Vaikuntanathan, and Hoeteck Wee. Attribute-based encryption for circuits. In *STOC*, pages 545-554. ACM, 2013.

[HHSS17] Shai Halevi, Tzipora Halevi, Victor Shoup, and Noah Stephens-Davidowitz. Implementing bp-obfuscation using graph-induced encoding. In *ACM Conference on Computer and Communications Security*, pages 783-798. ACM, 2017.

[Lyu12] Vadim Lyubashevsky. Lattice signatures without trapdoors. In *EUROCRYPT*, volume 7237 of *Lecture Notes in Computer Science*, pages 738-755. Springer, 2012.

[MP12] Daniele Micciancio and Chris Peikert. Trapdoors for lattices: Simpler, tighter, faster, smaller. In *Advances in Cryptology—EUROCRYPT 2012—31st Annual International Conference on the Theory and Applications of Cryptographic Techniques*, Cambridge, UK, Apr. 15-19, 2012. *Proceedings*, pages 700-718, 2012.

[MR07] Daniele Micciancio and Oded Regev. Worst-case to average-case reductions based on Gaussian measure. *SIAM Journal on Computing*, 37(1):267-302, 2007.

[PR06] Chris Peikert and Alon Rosen. Efficient collision-resistant hashing from worst-case assumptions on cyclic lattices. In Theory of Cryptography, pages 145-166. Springer, 2006.

[Reg09] Oded Regev. On lattices, learning with errors, random linear codes, and cryptography. *J. ACM*, 56(6), 2009.

[SSTX09] Damien Stehlé, Ron Steinfeld, Keisuke Tanaka, and Keita Xagawa. Efficient public key encryption based on ideal lattices. In *International Conference on the Theory and Application of Cryptology and Information Security*, pages 617-635. Springer, 2009.

What is claimed is:

1. A method for use in verifying digital signatures, the method comprising performing, by a generating device:
   generating a gadget matrix G, wherein columns of the gadget matrix G comprise ascending powers of a base b;
   generating a reduced gadget matrix F, wherein the reduced gadget matrix F is generated by dropping/columns of the gadget matrix G, wherein a value of I is determined based on a desired bit level of security and a key size;
   sampling a probability distribution to form a trapdoor matrix R that functions as a secret key for generating a digital signature;
   generating a verification matrix A using the reduced gadget matrix F and the trapdoor matrix R; and
   transmitting, to a verification device, the verification matrix A, causing the verification device to verify the digital signature generated by a sending device, using the trapdoor matrix R.

2. The method of claim 1, wherein the base b of the gadget matrix G is 2.

3. The method of claim 1, wherein generating the verification matrix A comprises:
   sampling a uniform distribution to form a uniform matrix $\hat{A}$;
   forming a generation matrix $\overline{A}$ by concatenating an identity matrix I and the uniform matrix $\hat{A}$, wherein $\overline{A}=[I|\hat{A}]$; and
   forming the verification matrix A, wherein $A=[\overline{A}|F-\overline{A}R]$.

4. The method of claim 1, wherein I is in a range 0 to $(\log_b q)/2$ for a modulus q, and wherein the modulus q is between $2^{16}$ and $2^{24}$.

5. The method of claim 1, wherein the gadget matrix G comprises n repeats of k columns with ascending powers of the base b, and where generating the reduced gadget matrix F further comprises dropping the l columns with a smallest powers of the base b from each group of k columns of the gadget matrix G.

6. The method of claim 1, wherein the probability distribution is a Gaussian distribution.

7. The method of claim 1, wherein the verification matrix A is transmitted to the sending device.

8. The method of claim 1, wherein the verification matrix A is public.

9. A system for use in verifying digital signatures, the system comprising:
   one or more processors; and
   a non-transitory computer readable medium coupled to the one or more processors, the non-transitory computer readable medium comprising code, executable by the one or more processors to perform a method comprising:
   generating a gadget matrix G, wherein columns of the gadget matrix G comprise ascending powers of a base b;
   generating a reduced gadget matrix F, wherein the reduced gadget matrix F is generated by dropping/columns of the gadget matrix G, wherein a value of I is determined based on a desired bit level of security and a key size;
   sampling a probability distribution to form a trapdoor matrix R that functions as a secret key for generating a digital signature;
   generating a verification matrix A using the reduced gadget matrix F and the trapdoor matrix R; and
   transmitting, to a verification device, the verification matrix A, causing the verification device to verify the digital signature generated by a sending device, using the trapdoor matrix R.

10. The system of claim 9, wherein the base b of the gadget matrix G is 2.

11. The system of claim 9, wherein generating the verification matrix A comprises:
   sampling a uniform distribution to form a uniform matrix $\hat{A}$;
   forming a generation matrix $\overline{A}$ by concatenating an identity matrix I and the uniform matrix $\hat{A}$, wherein $\overline{A}=[I|\hat{A}]$; and
   forming the verification matrix A, wherein $A=[\overline{A}|F-\overline{A}R]$.

12. The system of claim 9, wherein l is in a range 0 to $(\log_b q)/2$ for a modulus q, and wherein the modulus q is between $2^{16}$ and $2^{24}$.

13. The system of claim 9, wherein the gadget matrix G comprises n repeats of k columns with ascending powers of the base b, and where generating the reduced gadget matrix F further comprises dropping the l columns with a smallest powers of the base b from each group of k columns of the gadget matrix G.

14. The system of claim 9, wherein the probability distribution is a Gaussian distribution.

15. The system of claim 9, wherein the verification matrix A is transmitted to the sending device.

16. The system of claim 9, wherein the verification matrix A is public.

* * * * *